(12) United States Patent
Miller et al.

(10) Patent No.: US 11,537,359 B2
(45) Date of Patent: Dec. 27, 2022

(54) SELF-LEARNING DIGITAL ASSISTANT

(71) Applicant: MICROSOFT TECHNOLOGY LICENSING, LLC, Redmond, WA (US)

(72) Inventors: Adi Miller, Ramat Hasharon (IL); Roni Karassik, Ramat Gan (IL); Danny Avigdor, Barkan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 199 days.

(21) Appl. No.: 16/368,658

(22) Filed: Mar. 28, 2019

(65) Prior Publication Data

US 2020/0310749 A1    Oct. 1, 2020

(51) Int. Cl.
*G06F 3/16*      (2006.01)
*G06F 9/48*      (2006.01)
*G06F 3/01*      (2006.01)

(52) U.S. Cl.
CPC ............ *G06F 3/167* (2013.01); *G06F 9/4881* (2013.01); *G06F 3/017* (2013.01)

(58) Field of Classification Search
CPC ......... G06F 3/167; G06F 9/4881; G06F 3/017
See application file for complete search history.

(56) References Cited

U.S. PATENT DOCUMENTS

| | | | | |
|---|---|---|---|---|
| 2013/0254139 A1* | 9/2013 | Lei | ........................ | G06N 20/00 706/11 |
| 2014/0278413 A1* | 9/2014 | Pitschel | .................. | G10L 15/22 704/243 |
| 2015/0121216 A1 | 4/2015 | Brown et al. | | |
| 2016/0155442 A1* | 6/2016 | Kannan | .................... | G10L 15/22 704/275 |
| 2017/0277993 A1 | 9/2017 | Beaver et al. | | |
| 2018/0165581 A1* | 6/2018 | Hwang | ..................... | G06N 5/04 |
| 2019/0235887 A1* | 8/2019 | Hemaraj | ................. | G06F 3/167 |

FOREIGN PATENT DOCUMENTS

WO    2018175137 A1    9/2018

OTHER PUBLICATIONS

"International Search Report and Written Opinion Issued in PCT Application No. PCT/US20/023471", dated Jun. 17, 2020, 11 Pages.

\* cited by examiner

*Primary Examiner* — Joseph Saunders, Jr.
(74) *Attorney, Agent, or Firm* — Shook, Hardy & Bacon L.L.P.

(57) ABSTRACT

A response activity pattern may be ascertained from a set of computing devices obtained during a monitoring mode of operation. The monitoring mode of operation can be initiated when a user command is determined to be a new or unknown command. The response activity pattern may be used to generate a response profile indicating an activity to carry out using one or more user devices to perform a task associated with the user command. When an indication of a previously unknown user command to perform a task is received, the generated response profile can be used to perform the designed task by carrying out the activity using the one or more user device. In this way, the activity that should be carried out to perform the task can be learned based on the monitored user activity related to the one or more user devices.

20 Claims, 7 Drawing Sheets

SELF-LEARNING DIGITAL ASSISTANT

BACKGROUND

People are increasingly interacting with computing devices and relying on these devices for information, recommendations, and other services to assist them in their day-to-day tasks. For instance, a person may interact with a smart speaker, a smart watch, or their mobile device by speaking a command, such as asking for directions or turning on the lights. Many of these "smart" computing devices include intelligent functionality for responding to the user's commands, such as a digital assistant application operating on the computing device. However, often these computing devices (or their digital assistant applications) are unresponsive to the user's commands because they do not know how to carry out a task associated with the command In such instances, these smart devices do not seem smart at all, and leave users feeling frustrated.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technologies described in this disclosure are directed to systems and methods for improved digital-assistant technology and improving the capability of computing devices to respond accurately to user commands by expanding the functionality of a digital assistant through a learning mechanism. At a high level, an interactive computing device, such as a smart speaker or mobile device, or a digital assistant program operating thereon, can learn to carry out a specific response activity associated with a particular user command. The user command may comprise a request to perform a task, such as turning on the lights. For instance, when an unknown command is received from a user, instead of ignoring the command or merely responding to the user with an indication that the command is unknown, the computing device monitors user activity to learn operations performed by the user. In particular, upon a determination that a command received from a user is not recognized, the computing system (or digital assistant) may enter a special mode of operation wherein the user's activity on a computing device that occurs following the unrecognized command is monitored. User activity may be monitored on the computing device or on another computing device, and the user may consent to the monitoring operation. In this way, the computer system learns operations to perform to carry out a task, in response to new or previously unknown user commands.

For example, in an embodiment, an indication of a user command to perform a task can be received by a user-interactive computing device. Upon determining that the user command does not correspond to a known response action, a monitoring mode of operation may be initiated. In particular, a library of user commands or set of known commands and/or responses may be utilized to determine whether the received user command is known or unknown. Thus, the monitoring mode of operation may be initiated when the user command is absent from the set or library of known commands In some embodiments, upon a determination that a user command is unknown, the computing device (or a digital assistant application or software service operating on the computing device) may enter a failure state, during which the monitoring of user-related activity is performed. The failure state may be characterized by heightened user-activity monitoring carried out in order for the system to learn a response activity to be associated with the unknown user command In this way, the response activity may be learned from the monitored user activity. In some instances, user consent may be obtained prior to performing the heightened user-activity monitoring, and in some instances, the computing device may provide an indication to the user that a monitoring mode (or learning mode) of operation is occurring.

Upon initiating a monitoring mode of operation, the computing devices associated with a user (i.e., "user devices") may employ one or more sensors and/or monitoring software services to generate data relevant to a user's activity on a user device(s). Such user activity can be monitored as response activity event(s) (which may be performed by a user or at the direction of the user) associated with one or more user devices. The response activity event(s) may be monitored, tracked, and used for determining a response activity pattern. The response activity patterns may include, without limitation, patterns based on time, location, content, or other context, as described herein. In some embodiments, a response activity pattern may be determined based on response activity events related to user activity associated with one or more user devices or user activity otherwise determinable via the one or more user devices.

Based on the determined response activity pattern, a response profile corresponding to the user command may be determined and used to provide improved user experiences. For example, a response profile may specify one or more user commands and corresponding operations to be performed to carry out a task associated with the command. In some embodiments, a response profile may be determined from user activity learned from a plurality of users, and in some embodiments, a response profile may further include user-device mappings that enable the operations to be performed on different types of user devices, such as different brands of smart lights or smart thermostats. Examples of improved user experiences, which are further described herein, may include an improved user experience of interacting with a computing device based on the computing device understanding previously unknown user commands and causing an operation to be performed to carry out the task associated with the user command.

In some embodiments, the response activity patterns may be made available to one or more applications and services that consume this information to provide an improved user experience. For example, the response activity pattern (or information derived from the patterns such as operations to perform to carry out a task) may be included in a response profile that is provided on a server or made accessible to other computing devices so that the devices can learn to respond to new or unknown commands In this way, digital-assistant technology is improved by enabling computing devices (or digital assistants operating thereon) to learn to respond to new or previously unknown commands thereby expanding the functionality of the computing devices and improving the user experience.

BRIEF DESCRIPTION OF THE DRAWINGS

Aspects of the disclosure are described in detail below with reference to the attached drawing figures, wherein.

DETAILED DESCRIPTION

Figure 1:
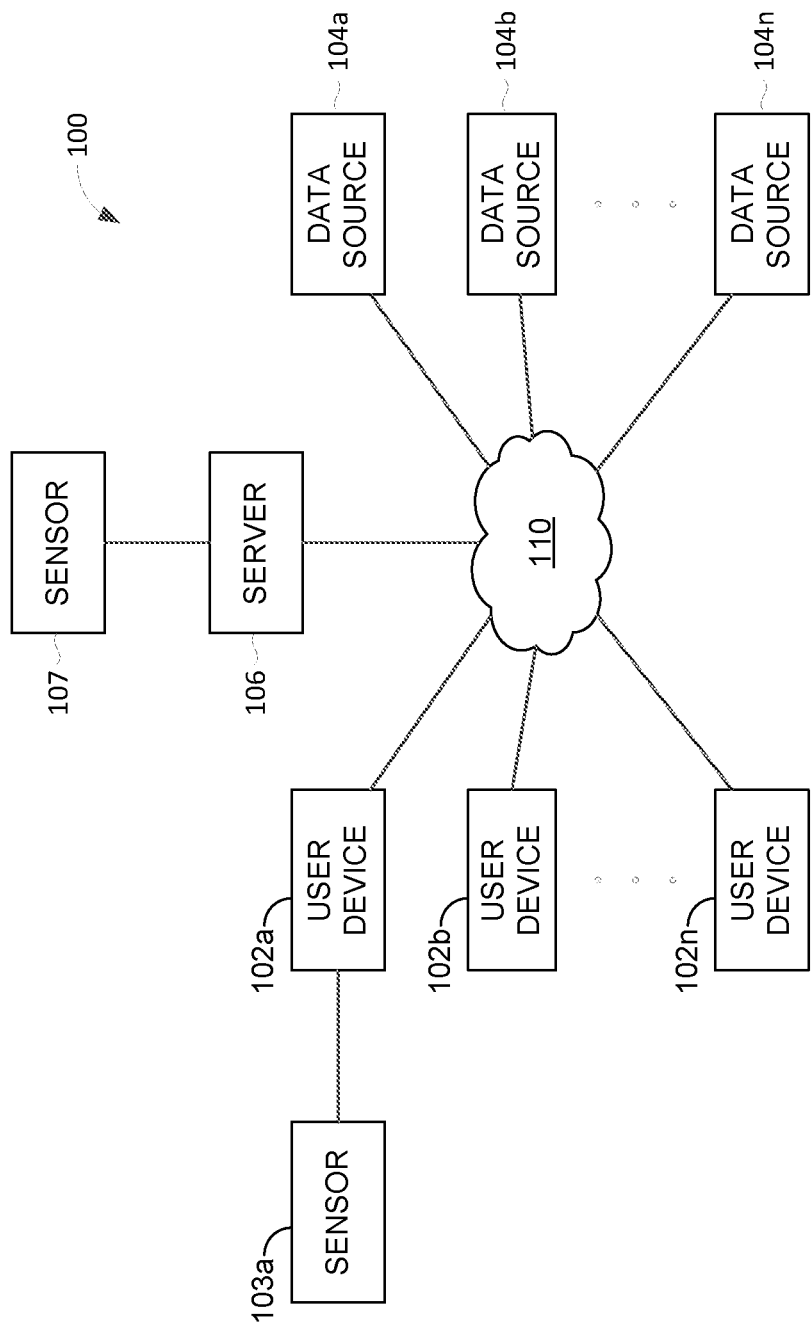
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are directed towards systems, methods, and computer storage media for, among other things, improved digital-assistant technology and improving the capability of computing devices to respond accurately to user commands by expanding device functionality through a learning mechanism. A user command may generally refer to a command, statement, or declaration indicating or corresponding to a request to perform a particular task or operation. A digital assistant or personal digital assistant, which also may be generally referred to as a virtual assistant, comprises one or more computer programs, and which may operate on or across one or more computing devices. For example, one such virtual assistant is the Cortana® assistant by Microsoft® Corporation. In particular, embodiments of the computing devices described herein (and/or the digital assistants or software applications operating thereon) may learn to carry out a task in response to a particular user command. For example, during a user interaction with a computing device, a user may provide a command by speaking (i.e., a voice command), by gesturing, touch, or other input means to the computing device. The command may be received by a user interface or sensor, such as a microphone, camera, touch-screen, keyboard, or other input means or user-interface. The computing device may comprise a smart device, such as a smart speaker, mobile device with an app or interactive service, a digital assistant program operating on a computing device, or other examples of computing devices described herein. The user command may comprise a request to perform a particular task, such as, by way of example and without limitation, turning on the lights, playing or recording a television show, launching an application on a computing device, navigating to a website, scheduling a meeting, booking a meeting or venue, configuring a setting on a computing device or appliance, or performing an operation or series of operations utilizing one or more computing devices (e.g., launching an app or navigating to a particular website and initiating an operation, such as making a restaurant reservation, travel booking, purchase, playing a video, retrieving and presenting or reading information such as a news feed, or other operation(s)). The task performed in response to a user command may comprise a set of one or more operations that are carried out via the computing device or another computing device.

As described previously, user interactions with computing devices are becoming increasingly frequent, as the prevalence of these devices increases. For example, many people now own smart speakers or other "smart" computing devices in their homes, in their vehicles, or wear such smart devices on their person. User interactions wherein a user requests the device to carry out a task on behalf of the user are also becoming more common. When a particular user command is known by the computing device (whether the command is pre-programed or learned), responding to the command by the computing device may involve performing (or causing to be performed) one or more operations associated with the user command (or the task). In some instances, a portion of these operations may be performed by another computing device. For instance, if the user command is "Turn up the thermostat," then the task of adjusting the temperature setting on the thermostat may be carried out by the computing device, such as a mobile device having an app installed thereon for controlling the thermostat, and/or by another computing device, such as a smart thermostat. The ubiquity of these smart computing devices and the frequency with which users interact with them creates an expectation by the user that these devices will respond to the user's commands.

Figure 3A:
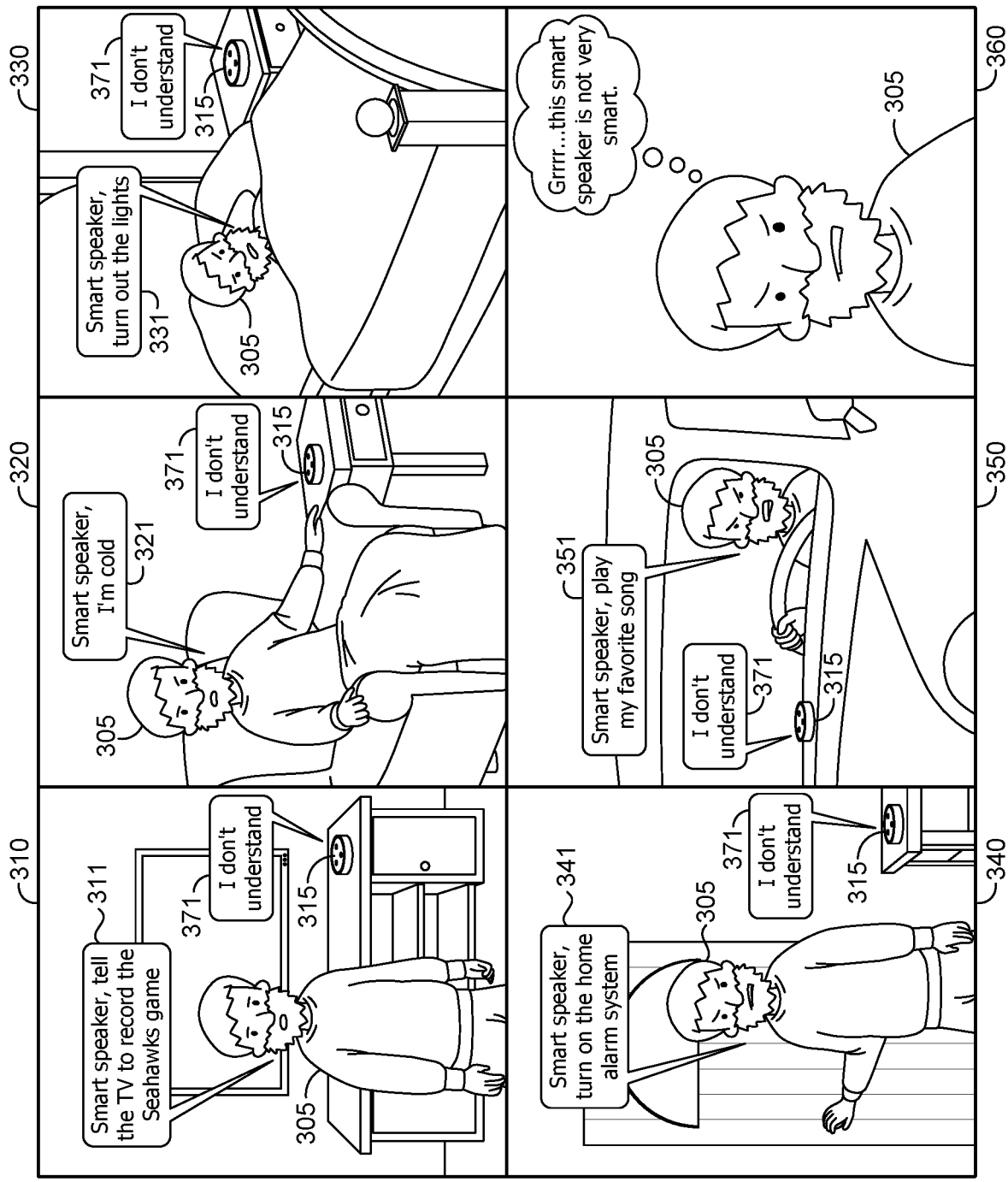
FIG. 3A depicts an example of a conventional voice-based interaction between a user and a digital assistant operation on a computing device, which is a smart speaker.

However, when a user command is unknown by the computing device, then the task (or the corresponding operation(s)) will fail to be initiated and/or performed. When these smart devices fail to perform a requested task, users are left feeling frustrated. An example of this is illustratively depicted in FIG. 3A, which shows the interaction between a user and a conventional computing device (a smart speaker). In particular, FIG. 3A shows a series of interactions between a user 305 and a smart speaker 315. In the first interaction (scene 310), in response to the user's command 311 to perform a task of having the TV record the Seahawks game, the conventional smart speaker (or more specifically, the conventional digital assistant operating on the smart speaker) responds at 317 with "I don't understand." As shown in scene 320, the user 305 is beginning to lose patience with the smart speaker 315. In response to the user's command 321 to tell smart speaker 315 that he is cold (which may imply performing a task of turning up the heat), the smart speaker 315 responds 371 ("I don't understand"). By scene 330, the user 305 is getting very annoyed. As shown in scene 330, in response to the user's command 331 to tell smart speaker 315 to turn out the lights (e.g., to perform the task of turning out the lights), the smart speaker 315 responds 371 ("I don't understand"). At scene 340, the user 305 is getting even more frustrated. In scene 340, in response to the user's command 341 to tell the smart speaker 315 to turn on the home alarm system (e.g., to perform the task of activating the home alarm system), the smart speaker 315 responds 371 ("I don't understand"). By scene 350, the user 305 is livid. In response to the user's command 351 to tell the smart speaker 315 to play his favorite song (e.g., to perform the task of playing the user's favorite song), the smart speaker 315 responds 371 ("I don't understand"). In scene 360, user 305 is exasperated with the smart speaker (e.g., smart speaker 315) thinking that the smart speaker is not very smart.

Typically, when a conventional smart device receives an unrecognized command, the command is ignored by the device (or a program operating on the device), or the device (or a program operating on the device) may respond with an indication that the command is unknown. In contrast to the conventional technology and the frustrating experiences depicted in FIG. 3A, embodiments of the technologies described herein improve the operation of computing devices to respond effectively to user commands by expanding their functionality through a learning mechanism. In this way, the embodiments described herein also improve the user experience of interacting with these computing devices, or the digital assistant applications operating thereon. Instead of ignoring an unknown command or merely responding to the user with an indication that the command is unknown, the embodiments described herein monitor user activity performed subsequent to receiving the unknown command in order to learn operations performed by the user and associate those operations with the command.

In particular, upon a determination that a command received from a user is not recognized, the computing system (or digital assistant) may enter a special mode of operation wherein the user's activity is monitored. User activity may be monitored on the computing device or on one or more other computing devices. Data corresponding to user activity may be gathered over time using sensors on the computing device and/or on one or more user devices. From this monitored user activity data, the particular operations associated with performing the task corresponding to the user command, can be learned. In this way, the computing system (or digital assistant application) learns the operations(s) to be performed in response to the user command, in order to facilitate carrying out the task. In some instances, user consent may be obtained prior to performing the user-activity monitoring, and in some instances, the computing device may provide an indication to the user that a monitoring mode (or learning mode) of operation is occurring.

Accordingly, at a high level, aspects of the present disclosure relate to technologies enabling computer systems to learn to perform new tasks in response to new or previously unknown user commands In some embodiments, a task may be understood as a set of one or more computing-device operations desired by a user to be carried out by one or more user devices. Such operations can be related to an activity associated with the one or more user devices. Upon determining that a user command is not recognized, the computing system may initiate monitoring of user activity. This monitored user activity can be utilized to determine operations to be carry out in order to perform a task related to the user command. For instance, the next time the computer system receives an indication of the previously unknown user command, the system can implement its learned knowledge to perform the designated task by carrying out the activity using the one or more user device. In this way, the computer system learns what task to perform in response to new or previously unknown user commands.

In one embodiment, an indication of a user command to perform a task can be received by a user-interactive computing device. User commands or requests can generally be received as a voice-command, gesture, inputted into a computing device by a touch screen, keyboard, camera, microphone, other sensor, or other input means. As described herein, the command may comprise a request to perform a particular task and/or may correspond to a set of one or more operations to be performed in order to carry out the task. A task can be carried out by one or more user computing devices.

In some embodiments, a library or set of known commands and/or responses may be utilized to determine whether the received command is known or unknown. Moreover, in some instances, determining whether a user command is known or unknown may involve performing a similarity comparison. In these embodiments, a similarity comparison may be performed on aspects of a received user command to determine a similarity to other known user commands. For example, using a feature similarity technique such as clustering or Word2Vec, a measure of similarity may be determined, such as a similarity score. In some embodiments, where the similarity score is high or satisfies a predetermined threshold, then the command may be determined to be similar to a known command, and the operations corresponding to that known command may be carried out. However, where the similarity score does not satisfy the predetermined threshold, then it may be determined that the command is not similar to the set of known commands.

Upon determining that the user command is unknown, then a monitoring mode of operation may be initiated. In some embodiments, user activity may be monitored via the computing device and other user devices, which may be identified from monitored user data, as described herein. In some embodiments, user activity monitoring may be facilitated using an application or service that runs on a user device. Alternatively or in addition, the user activity monitoring may be facilitated using an application or service that runs in the cloud, which may scan, poll, or otherwise monitor the user device, or may detect online activity associated with the user device, such as http requests or other communication information, or otherwise receive information about user activity from the user device.

In some instances, upon a determination that a user command is unknown, the computing device (or a digital assistant application or software service operating on the computing device) may enter a failure state, during which the monitoring of user-related activity is performed. For instance, the failure state may include initiating program routines or services for performing the monitoring of user activity. In some embodiments, the failure state (or more generally the monitoring mode of operation) may be indicated to the user, such as by providing a notification or providing an indication by the device, such as changing the color of a light on the device or changing the color an app associated with the device, or similarly emitting a sound using the device or a sound provided by an app associated with the device, or otherwise providing a notification to the user that the device is monitoring activity to learn how to respond to the unknown command (e.g., which may be outputted by presentation component 220).

While in the monitoring mode, user activity can be monitored as response activity event(s) (which may be performed by a user) with regard to one or more user devices. A response activity event can generally be determined from at least one monitored user-activity operation performed on at least one user device (e.g., a user manually performing the response activity events to perform a desired task using one or more user devices). In some embodiments, the response activity event(s) may be related to a user's direct interaction(s) with one or more devices during monitoring initiated based on a user command In addition or alternatively, the response activity event(s) may be related to a user's interaction(s) with one or more devices using application (or app) related activity, such as application usage, which may include usage duration, launches, files accessed via the application or in conjunction with the application usage, or content associated with the application. The term application or app is used broadly herein, and generally refers to a computer program or computer application, which may comprise one or more programs or services, and may run on the user's device(s) or in the cloud.

As further described herein, in some embodiments, user devices may employ one or more sensors to generate data relevant to a user's response activity event(s) via a user device(s). In some embodiments, these response activity events can occur and be detected during the monitoring mode of operation. In particular, data corresponding to such response activity events may be gathered over time (e.g., while in monitoring mode) using sensors on the one or more user devices associated with the user.

The response activity event data may be monitored, tracked, and used for determining response activity patterns. The term "response activity pattern" is used broadly herein and may refer to a plurality of user interactions with one or more user devices, activity by the user on or in connection to one or more user devices, events (including actions) related to user activity, or any type of response activity event determinable via a computing device, wherein the plurality of interactions, actions, events, or activity share common features or characteristics. In some embodiments, these in-common features or variables may comprise features characterizing a response activity event, time, location, or other types of contextual information associated with the response activity event, as further described herein. Examples of response activity patterns may include, without limitation, response activity patterns corresponding with user commands based on time (e.g., the user command "Turn on lights" at 7:00 a.m. relates to the response activity pattern of turning on master bedroom lights, master bathroom lights, and kitchen lights, as opposed to, the user command "Turn on lights" at 5:30 p.m. relates to the response activity pattern of turning on kitchen lights, living room lights, and dining room lights), location (e.g., the user command "Play music" when at work relates to the response activity pattern of playing classical music, as opposed to, the user command "Play music" when at home relates to the response activity pattern of playing house music), content (e.g., the user command "It's a little chilly in here" relates to the response activity pattern of turning up a smart thermostat by two degrees, as opposed to, the user command "I'm freezing" relates to the response activity pattern of turning up a smart thermostat by four degrees), or other context, as described herein.

In some embodiments, the response activity events may be associated with, or used to generate, a response profile that corresponds to the user command, and is associated with the task based on a history of sensed user activity. In this way, when an indication of a user command is received in the future, the response activity event(s) associated with the task can be determined and used to cause an operation to be performed to carry out the task. These response activity event(s) can be associated with the task. From this response activity information, a computer system may learn response activity events that correspond to the user command and are associated with user activity related to the user device(s) that carry out the task (from the user command).

More specifically, based on the determined patterns of response activity events, response profile(s) may be generated, regarding desired interactions (e.g., response activity event(s)) associated with one or more user devices that correspond to a task in response to a user command, and used to provide improved user experiences. In some embodiments, the response activity patterns, or the response profiles generated therefrom, may be made available to one or more applications and services that consume this information to provide an improved user experience of interacting with a computing device, or the digital assistant applications operating thereon (e.g., understanding previously unknown user commands and causing an operation to be performed to carry out the task associated with the user command) For example, in one embodiment, the response activity pattern information and/or generated response profiles may be provided via an Application Programming Interface (API) so that third-party applications and services can use it, such as by determining and/or providing device mappings, suggestions, or other information or services relevant to users based on the learned response activity patterns.

Accordingly, in one example aspect, user data is received from one or more data sources. The user data may be received by collecting user data with one or more sensors or components on user device(s) associated with a user. Examples of user data, also described in connection to user-data collection component 210 of FIG. 2, may include information about the user device(s) and response activity information associated with the user devices (e.g., user-interactions with the device(s), app usage, online activity, searches, calls, usage duration, and other user-interaction data). The received user data may be monitored, analyzed (e.g., feature extraction) and information about the response activity event(s) may be stored (e.g., in a user profile, such as user profile 240 of FIG. 2) to facilitate a pattern analysis.

In particular, user data may be analyzed to detect various features associated with response activity event(s). Detected user actions or response activity event(s), which may include actions such as direct interactions with one or more user devices, applications launched, or other actions similar to those described herein, may be logged with associated contextual data, for example, by logging the observed user action with a corresponding time stamp, location stamp, and/or associating the response activity event(s) with other available contextual information. In some embodiments, such logging may be performed on each user device, so that response activity patterns may be determined across devices. Further, in some embodiments, cloud-based user-activity information sources may be used such as online user calendars or user activities determined from social media posts, emails, or the like. These sources also may be used for providing other context to the response activity event(s) detected on the user device(s). Examples of contextual information are further described in connection to contextual information determiner 284 in FIG. 2. In some embodiments, user activity logs from multiple user devices and available user activity information from cloud-based sources may be combined, thereby representing a composite response activity event(s) history.

From the activity logs or user activity data, historical response activity event(s) may be determined and provided to response activity patterns engine. Based on an analysis of historical response activity event(s), and in some cases current sensor data regarding response activity event(s), a set of one or more likely response activity patterns may be determined. In particular, the response activity patterns engine may conduct an analysis of the historical response activity event(s) information to identify response activity patterns, which may be determined by detecting repetitions of similar user actions or routines, in some embodiments.

In some embodiments, a corresponding confidence weight or confidence score may be determined regarding the response activity patterns. The confidence score may be based on the strength of the pattern, which may be determined by the number of observations used to determine a pattern, how frequently the response activity event(s) is consistent with the pattern, the age or freshness of the activity observations, the number of features in common with the response activity event(s) observations that make up the pattern, or similar measurements. In some instances, the confidence score may be considered when providing a personalized user experience or other improved user experience. Further, in some embodiments, a minimum confidence score may be needed before using the response activity pattern to provide such experiences or other services. For example, in one embodiment, a threshold of 0.6 (or just over fifty percent) is utilized such that only response activity patterns having a 0.6 (or greater) likelihood of performing the desired task corresponding to a user command are used to initiate a response activity event that performs the task. Nevertheless, where confidence scores and thresholds are used, determined response activity patterns of response activity event(s) with confidence scores less than the threshold may still be monitored since additional observations of response activity event(s) may increase the confidence for a particular pattern.

In some embodiments, crowdsourced response activity event history may also be utilized in conjunction with a user's own response activity event(s) history. For example, for a given user, a set of other users similar to the given user may be identified, based on having features or characteristics in common with the given user. This might include other users located in proximity to the given user, the given user's social media friends, ownership of similar user devices (which may be determined from an analysis of contextual information associated with the given user), other users with similar response activity events, or the like. Information about response activity event history from the other users may be relied upon for inferring patterns of response activity event(s) for the given user. This may be particularly useful in situations where little response activity event(s) history exists for the given user, such as where the user is a new user. In some embodiments, user activity information from similar users may be imputed to the new user until enough of a response activity event(s) history is available for the new user to determine statistically reliable response activity patterns, which may be determined based on the number of observations included in the response activity event(s) history information or the statistical confidence of the determined response activity patterns, as further described herein. In some cases, where the response activity event(s) history comes from other users, the resulting inferred response patterns for the given user may be assigned a lower confidence.

In some embodiments, a semantic analysis is performed on the response activity event(s) and associated information to characterize aspects of the response activity event(s). For example, features associated with a response activity event may be categorized (such as by type, similar time frame or location, for example), and related features may be identified for use in determining a similarity or relational proximity to other response activity events, such as by having one or more of the characteristics, including categories and related features, in common. In some embodiments, a semantic knowledge representation, such as a relational knowledge graph, may be employed. In some embodiments, the semantic analysis may use rules, logic such as associations or conditions, or classifiers.

The semantic analysis may also be used to characterize information associated with the response activity event, such as determining that a location associated with the user activity corresponds to a hub or venue of interest to the user based on frequency of visits, such as the user's home, work, gym. (For example, the user's home hub may be determined to be the location where the user spends most of her time between 8 p.m. and 6 a.m.) Similarly, the semantic analysis may determine time of day that corresponds to working hours, lunchtime, commute time.

In this way, the semantic analysis may provide other relevant features of the response activity events that may be used to determine response activity patterns. For example, in addition to determining a particular device that the user desired to activate with a user command, such as "Play music on garage speakers," the category of the music associated with the task of playing music on the garage speakers may be determined (e.g., using a response activity pattern), for instance, EDM music. In embodiments, different categories can have additional response activity events (e.g., increased bass for EDM music). Similarly, the semantic analysis may categorize the response activity event as being associated with work or home, based on the characteristics of the activity (e.g., playing classical music in response to a user command "play music" at a location corresponding to the user's office may be determined to be work-related activity, whereas playing house music in response to a user command "play music" at a location corresponding to the user's home may be determined to be home-related activity). These aspects characterizing the response activity event then may be considered when evaluating the response activity event(s) to identify response activity patterns. For example, a pattern of turning up a smart thermostat by two degrees may be determined where a user routinely turns up the thermostat by two degrees (e.g., upon a user command such as "It's cold" triggering a failure state). Such a pattern of response activity events can be correlated with the user command that triggered the failure state—"It's cold."

As described previously, the response activity patterns may be used generate response profiles that corresponds to a user's command(s). From these response profiles, various implementations may provide improved user experiences. For example, some embodiments may initiate a task using the response activity pattern (e.g., by performing a response activity event) associated with a user's computing devices (in response to a received user command) Some embodiments may be carried out by a personal assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, a smart speaker, smart electronics or devices, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106, or may be incorporated and/or integrated into at least one of those components. In one embodiment, one or more of data sources 104a though 104n comprise one or more sensors, which may be integrated into or associated with one or more of the user device(s) 102a, 102b, or 102n, or server 106. Examples of sensed user data made available by data sources 104a though 104n are described further in connection to user-data collection component 210 of FIG. 2.

Figure 2:
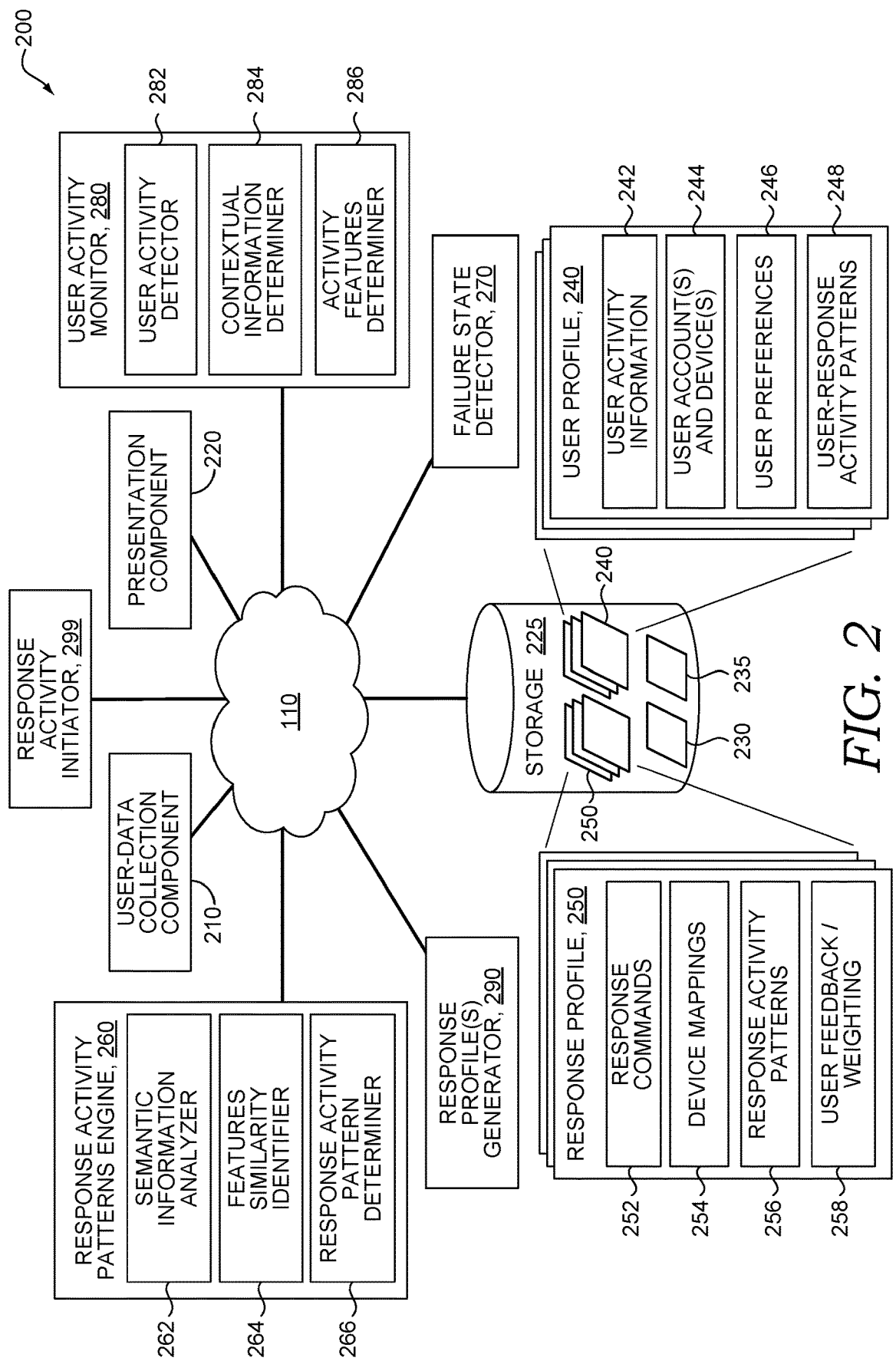
FIG. 2 is a diagram depicting an example computing architecture suitable for implementing aspects of the present disclosure.

Operating environment 100 can be utilized to implement one or more of the components of system 200, described in FIG. 2, including components for collecting user data, monitoring activity events, determining a state failure, monitoring response activity events, determining response activity patterns, generating response personalized and/or universal profile(s) to provide an improved user experience, and/or initiating a response activity triggered by a recognized command. Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, user activity monitor 280, activity pattern inference engine 260, failure state detector 270, and storage 225. User activity monitor 280 (including its components 282, 284, and 286), response activity patterns engine 260 (including its components 262, 264, and 266), user-data collection component 210, presentation component 220, failure state detector 270, response profile(s) generator 290, and response activity initiator 299 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user activity monitor 280, response activity patterns engine 260, response profile(s) generator 290, failure state detector 270, or response activity initiator 299. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a smart speaker, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Continuing with FIG. 2, example system 200 includes failure state detector 270. In embodiments, failure state detector 270 comprises applications or services that process collected user-data (e.g., a user command) in conjunction with a device response (or lack thereof) to identify a failure in the device. A user command may be received as user-data collected by user-data collection component 210. In embodiments, such a user command may include a spoken command, a gesture, an interaction with the device (via a screen), or any other manner of entering a command. A failure mode or failure state may be considered to occur when a user device receives an indication of a user command and determines that the command is unknown or unrecognized. For example, the command itself may be unknown or the task associated with the command may be unknown. For instance, in an embodiment, a computer program or service may compare the received user command against a set of known (e.g., predetermined) commands or known (e.g., predetermined) response actions (what operations are specified to be performed in response to the command). The set of known commands and/or response actions may be stored as a list, library, index, and/or in a database, such as response actions 235, which are stored in storage 225.

In some embodiments, a library or set of known commands and/or responses may be utilized by failure state detector 270 (or another component of the computing system) to determine whether the received command is known or unknown. In some embodiments, a user command may be determined to be unknown when the user command is not correlated with a task (e.g., as determined using a library of response operations known to a device based on user commands associated with tasks). For example, a user command, "It's cold in here," may not be correlated with the task of turning up the temperature using a smart thermostat. In some instances, determining whether a user command is known or unknown may involve performing a similarity comparison. In these embodiments, a similarity comparison may be performed on aspects of a received user command to determine a similarity to aspects of other known user commands or response actions, such as the information stored in storage 225. For example, using a feature similarity technique, such as clustering or Word2Vec, a measure of similarity may be determined, such as a similarity score. In some embodiments, where the similarity score is high or satisfies a predetermined threshold, the command may be determined to be similar to a known command, and the operations corresponding to that known command may be carried out. However, where the similarity score does not satisfy the predetermined threshold, it may be determined that the command is not similar to the set of known commands, which may trigger the failure state, during which user activity may be monitored.

In some embodiments, failure state detector 270 may initiate a monitoring mode of operation upon the determination that a received user command is unknown. In some instances, the monitoring mode of operation can be in response to an initiated failure state in a device. By way of example and without limitation, a user may explicitly invoke a device and provide a user command that is not recognized by the device. In some embodiments, a device can be explicitly invoked using a trigger name (e.g., "Ok Google," "Alexa," "Hey, Cortana"). In other embodiments, a device can be explicitly invoked based on the user command (e.g., "Turn on TV," "It's cold in here," "Play my song"). Upon detection of an unknown command, as determined by failure state detector 270, a heightened mode of monitoring user activity can be initiated.

In some implementations, a user may explicitly enter the monitoring mode (e.g., by explicitly triggering the failure state). For example, this is a mode of operation wherein the user can teach the device specific operations to respond to a particular command. For instance, a user may initiate the monitoring mode to teach the computing device how the user would like the device to perform a task associated with a particular user command. In another instance, a user can initiate the monitoring mode to correct (or improve) a scenario where the computing device does respond to a user command, but the response is incorrect or is not generally what the user desires (e.g., based on the user's preferences). For example, the user may provide feedback to the system such as saying "No that's wrong" or "That's not what I want" or may select an option in an application, or provide other feedback indicating that the operations performed by the computing device in response to a user command are incorrect. Such feedback can initiate the monitoring mode thereby enabling the system to learn new response(s) and/or check to see if another response profile is available (e.g., on a server location having published response profiles) for responding to that user command. In such scenarios, the user can want the computing device to carry out different response activity events to perform the task related to the command rather than the current response activity events. In embodiments, setting a new response activity pattern can replace the old response activity pattern (e.g., temporarily or permanently replacing the response activity pattern). In still another example, the computing device may have learned an incorrect response activity for the command in the first place (e.g., turning on the lights and turning up the heat based on user command "I'm cold" when the user really just wants to computing device to turn up the heat). In this way, the system has capability for a user to override previously learned or predetermined operations performed by the computing device in order to modify (e.g., correct or improve) how the computing device responds to a user command.

User activity monitor 280 is generally responsible for monitoring user data for information that may be used for determining user activity information, which may include identifying and/or tracking features (sometimes referred to herein as "variables") or other information regarding specific user actions and related contextual information. Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social media, or similar information sources), and which may include contextual information associated with the identified user activity. User activity monitor 280 may determine current or near-real-time user activity information and may also determine historical user activity information, in some embodiments, which may be determined based on gathering observations of user activity over time, accessing user logs of past activity (such as browsing history, for example). Further, in some embodiments, user activity monitor 280 may determine user activity (which may include historical activity) from other similar users (i.e., crowdsourcing), as described previously.

In some embodiments, user activity monitor 280 is responsible for monitoring user activity information upon failure state detector 270 detecting a failure mode. In such an embodiment, user activity information can be monitored as response activity event(s). Such response activity event(s) can be the activity (e.g., activity or set of activities) that a user performs upon a device failing to fulfill a command (e.g., detection/entering of a failure mode). Information determined by user activity monitor 280, including information regarding current response activity event(s), response activity event(s) within a defined timeframe, and/or historical response activity event(s), may be provided to response activity patterns engine 260. As described previously, response activity event(s) may be determined by monitoring user data received from user-data collection component 210. In some embodiments, the user data, information about the user activity, and/or response activity event(s) determined from the user data is stored in a user profile, such as user profile 240.

As an example, upon a failure state triggering heightened user monitoring, user activity monitor 280 can closely monitor user activities, for instance, what activity and/or set of activities the user performs after failure of a user command. In particular, upon failure of the user command "It's cold in here," user activity monitor 280 can detect that the user increases the temperature on a smart thermostat (e.g., by two degrees). User activity monitor 280 can also detect that the user turned down the volume on a TV and turned on hallway lights.

In an embodiment, user activity monitor 280 comprises one or more applications or services that analyze information detected via one or more user devices used by the user and/or cloud-based services associated with the user to determine activity information and related contextual information. Information about user devices associated with a user may be determined from the user data made available via user-data collection component 210, and may be provided to user activity monitor 280, response activity patterns engine 260, or other components of system 200.

More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user activity monitor 280 may determine, from the user data, one or more user devices associated with a particular user and user device related activity (which may include contextual information associated with the identified user device(s)). In an embodiment, user activity monitor 280 comprises one or more applications or services that analyze the user devices used by the user to determine information about the devices and device usage. In some embodiments, user activity monitor 280 monitors user data associated with the user devices and other related information on a user device, across multiple computing devices or in the cloud. Information about the user's user devices may be determined from the user data made available via user-data collection component 210, and maybe provided response activity patterns engine 260 or response profile(s) generator 290, among other components of system 200. In some implementations of user activity monitor 280, a user device may be identified by detecting and analyzing characteristics of the user device, such as device hardware, software such as OS, network-related characteristics, user accounts accessed via the device, and similar characteristics. For example, information about a user device may be determined using functionality of many operating systems to provide information about the hardware, OS version, network connection information, installed application, or the like. Similarly, some embodiments of user activity monitor 280, or its subcomponents, may determine a device name or identification (device ID) for each device associated with a user.

This information about the identified user device(s) associated with a user may be stored in a user profile associated with the user, such as in user account(s) and device(s) 244 of user profile 240. In an embodiment, the user devices may be polled, interrogated, or otherwise analyzed to determine information about the devices. This information may be used for determining a label or identification of the device (e.g., a device ID) so that the user interaction with the device may be recognized from user data by user activity monitor 280. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As shown in example system 200, user activity monitor 280 may comprise a user activity detector 282, contextual information determiner 284, and an activity features determiner 286. In some embodiments, user activity monitor 280, one or more of its subcomponents, or other components of system 200, such as failure state detector 270, response activity patterns engine 260, or response profile(s) generator 290 may determine interpretive data from received user data. Interpretive data can correspond to data utilized by these components of system 200 or subcomponents of user activity monitor 280 to interpret user data. For example, interpretive data can be used to provide other context to user data, which can support determinations or inferences made by the components or subcomponents. Moreover, it is contemplated that embodiments of user activity monitor 280, its subcomponents, and other components of system 200 may use user data and/or user data in combination with interpretive data for carrying out the objectives of the subcomponents described herein. Additionally, although several examples of how user activity monitor 280 and its subcomponents may identify user activity information are described herein, many variations of user activity identification and user activity monitoring are possible in various embodiments of the disclosure.

User activity detector 282, in general, is responsible for determining (or identifying) a user action or user activity event has occurred. Embodiments of activity detector 282 may be used for determining current response activity event(s) and/or one or more historical response activity event(s). Some embodiments of activity detector 282 may monitor user data for activity-related features or variables corresponding to response activity event(s) such as indications of applications launched or accessed, files accessed, modified, copied, websites navigated to, online content downloaded and rendered or played, devices interacted with, or similar user activities.

Additionally, some embodiments of user activity detector 282 extract from the user data information about response activity event(s), which may include current response activity event(s), historical response activity event(s), and/or related information such as contextual information. (Alternatively or in addition, in some embodiments, contextual information determiner 284 determines and extracts contextual information. Similarly, in some embodiments, activity features determiner 286 extracts information about response activity event(s), such as user activity related features, based on an identification of a response activity event determined by user activity detector 282.) Examples of extracted user activity information may include app usage, online activity, searches, calls, usage duration, application data (e.g., emails, messages, posts, user status, notifications), or nearly any other data related to user interactions with the user device or user activity via a user device. Among other components of system 200, the extracted user activity information determined by user activity detector 282 may be provided to other subcomponents of user activity monitor 280, response activity patterns engine 260, or response profile(s) generator 290. Further, the extracted user activity may be stored in a user profile associated with the user, such as in user activity information component 242 of user profile 240. In some embodiments, user activity detector 282 or user activity monitor 280 (or its other sub components) performs conflation on the detected response activity event(s). For example, overlapping information may be merged and duplicated or redundant information eliminated.

In some embodiments, the user activity-related features may be analyzed to detect response activity event(s). For example, in some embodiments, user activity detector 282 employs user activity event logic, which may include rules, conditions, associations, classification models, or other criteria, to identify response activity event(s). For example, in one embodiment, user activity event logic may include comparing user activity criteria with the user data in order to determine that a response activity event has occurred. The activity event logic can take many different forms depending on the mechanism used to identify a response activity event. For example, the user activity event logic could be training data used to train a neural network that is used to evaluate user data to determine when a response activity event has occurred. The activity event logic may comprise fuzzy logic, neural network, finite state machine, support vector machine, logistic regression, clustering, or machine-learning techniques, similar statistical classification processes, or combinations of these to identify response activity event(s) from user data. For example, activity event logic may specify types of user device interaction(s) information that are associated with a response activity event, such as launching an app, manual input, or other interaction with a device. In some embodiments, a series or sequence of user device interactions may be mapped to a response activity event, such that the response activity event may be detected upon determining that the user data indicates the series or sequence of user interactions has been carried out by the user.

In some embodiments, activity event logic may specify types of user-device related activity that is considered a response activity event, such as activity that happens while a user is logged into the user device, while user interfaces are receiving input (e.g., while a computer mouse, touchpad, screen, voice-recognition interface, or the like are active), or certain types of activity like launching applications, modifying files with applications, opening a browser and navigating to a website. In this way, the activity event logic may be used to distinguish genuine user activity from automated activity of processes running on the user devices, such as automatic updates or malware scanning Once a user activity is determined, these features or additional related features may be detected and associated with the detected response activity event for use in determining activity patterns.

In some embodiments, user activity detector 282 runs on or in association with each user device for a user. User activity detector 282 may include functionality that polls or analyzes aspects of the operating system to determine user activity related features (such as installed or running applications or file accesses and modifications, for example), network communications, and/or other user actions detectable via the user device including sequences of actions.

Contextual information determiner 284, in general, is responsible for determining contextual information related to a response activity event (detected by user activity detector 282 or user activity monitor 280), such as context features or variables associated with the response activity event, related information, and user-related activity, and further responsible for associating the determined contextual information with the detected user activity. In some embodiments, contextual information determiner 284 may associate the determined contextual information with the response activity event and may also log the contextual information with the associated response activity event. Alternatively, the association or logging may be carried out by another service. For example, some embodiments of contextual information determiner 284 provide the determined contextual information to activity features determiner 286, which determines activity features of the response activity event and/or related contextual information.

Some embodiments of contextual information determiner 284 determine contextual information related to a user action or response activity event such as entities identified in a response activity event or related to the event (e.g., temperature was increased by two degrees). Further, user activity can be associated with a location or venue of the user's device. By way of example and not limitation, this may include context features such as location data, which may be represented as a location stamp associated with the response activity event; contextual information about the location, such as venue information (e.g., this is the user's office location, home location, school, restaurant, move theater); yellow pages identifier (YPID) information, time, day, and/or date, which may be represented as a time stamp associated with the response activity event; user device characteristics or user device identification information regarding the device on which the user carried out the response activity event; duration of the user response activity event, other user response activity event(s) preceding and/or following response activity event (such as a sequence of device interactions, sequences of application usage, such as interacting with one or more devices, sequences of or website usage, such as inputting a particular search query); other information about the response activity event such as entities associated with the response activity event (e.g., venues, people, objects); information detected by sensor(s) on user devices associated with the user that is concurrent or substantially concurrent to the response activity event (e.g., motion information or physiological information detected on a fitness tracking user device, listening to music, which may be detected via a microphone sensor if the source of the music is not a user device); or any other information related to the response activity event that is detectable that may be used for determining patterns of similar events.

In embodiments using contextual information related to user devices, a user device may be identified by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 244 of user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some implementations, contextual information determiner 284 may receive user data from user-data collection component 210, parse the data, in some instances, and identify and extract context features or variables (which may also be carried out by activity features determiner 286). Context variables may be stored as a related set of contextual information associated with the user activity, and may be stored in a user profile such as in user activity information component 242. In some cases, contextual information may be used by one or more activity pattern consumers, such as for personalizing content or a user experience, such as when, where, or how to present content. Contextual information also may be determined from the user data of one or more users, in some embodiments, which may be provided by user-data collection component 210 in lieu of or in addition to user activity information for the particular user.

Activity features determiner 286 can generally be responsible for determining activity-related features (or variables) associated with the response activity event that may be used for identifying patterns of similar events. Activity features may be determined from information about a response activity event and/or from related contextual information. In some embodiments, activity features determiner 286 receives response activity event(s) or related information from user activity monitor 280 (or its subcomponents), and analyzes the received information to determine a set of one or more features associated with the response activity event(s).

Examples of activity-related features include, without limitation, location-related features, such as location of the user device(s) during the response activity event, venue-related information associated with the location, or other location-related information; time-related features, such as time(s) of day(s), day of week or month, or the duration of the response activity event, or related duration information such as how long the user used an application associated with the response activity event; user device-related features, such as device type (e.g., desktop, tablet, mobile phone, fitness tracker, heart rate monitor), hardware properties or profiles, OS or firmware properties, device IDs or model numbers, network-related information (e.g., mac address, network name, IP address, domain, work group, information about other devices detected on the local network, router information, proxy or VPN information, other network connection information), position/motion/orientation-related information about the user device, power information such as battery level, time of connecting/disconnecting a charger, and user-access/touch information; usage-related features, such as file(s) accessed, app usage (which may also include application data, in-app usage, concurrently running applications), network usage information, user account(s) accessed or otherwise used (such as device account(s), OS level account(s), or online/cloud-services related account(s) activity, such as Microsoft® account or Net Passport, online storage account(s), email, calendar, or social networking accounts); content-related features, such as online activity (e.g., searches, browsed websites, purchases, social networking activity, communications sent or received including social media posts); other features that may be detected concurrent with the response activity event or near the time or the response activity event; or any other features that may be detected or sensed and used for determining a pattern of response activity event(s). Features may also include information about user(s) using the device; other information identifying a user, such as a login password, biometric data, which may be provided by a fitness tracker or biometric scanner; and/or characteristics of the user(s) who use the device, which may be useful for distinguishing users on devices that are shared by more than one user. In some embodiments, user activity event logic (described in connection to user activity detector 282) may be utilized to identify specific features from user activity information related to the response activity event.

Continuing with system 200 of FIG. 2, response activity patterns engine 260 is generally responsible for determining response activity patterns based on the user activity information related to response activity event(s) determined from user activity monitor 280 (e.g., following detection of a failure state). In some embodiments, response activity patterns engine 260 may run on a server, as a distributed application across multiple devices, or in the cloud. At a high level, response activity patterns engine 260 may receive user activity-related information, which may be uploaded from user activity logs from client-side applications or services associated with user activity monitor 280. One or more inference algorithms may be applied to the user activity-related information to determine a set of likely response activity patterns (e.g., related to particular user commands) For example, patterns may be determined based on similar instances of observation of a user activity or associated contextual information, which may be referred to as "in-common features" of user activity-related information that occurs following a detected failure state. The inferred activity pattern information may be provided to response profile(s) generator 290 and/or used to generate a pattern-based prediction regarding a set of operations for performing a task associated with a particular user command. In some embodiments, a corresponding confidence is also determined for the response activity patterns, as described herein. Further, the response activity pattern may comprise confidence in initiating a single operation to perform a (future-occurring) task and/or a in initiating one of series of operations to perform the task, for example, an eighty percent likelihood that to perform a task associated with a user command, the response activity event will be increasing the temperature on a smart thermostat and a fifteen percent likelihood that the response activity event will be turning on a hallway light, and a five percent likelihood that the response activity event will be muting the volume on a TV.

As shown in example system 200, response activity patterns engine 260 may comprise semantic information analyzer 262, features similarity identifier 264, and response activity pattern determiner 266. Semantic information analyzer 262 is generally responsible for determining semantic information associated with the response activity-related features identified by user activity monitor 280. For example, while a response-activity feature may indicate a specific device the user interacted with, semantic analysis may determine how the device is interacted with or characteristics of the interaction. Semantic information analyzer 262 may determine additional response activity-related features semantically related to the response activity event, which may be used for identifying response activity patterns.

In particular, as described previously, a semantic analysis can be performed on the response activity information, which may include the contextual information, to characterize aspects of the user action or response activity event. For example, in some embodiments, activity features associated with a response activity event may be classified or categorized (such as by type, time frame or location, work-related, home-related, themes, related entities, other user(s) (such as communication to or from another user) and/or relation of the other user to the user (e.g., family member, close friend, work acquaintance, boss, or the like), or other categories), or related features may be identified for use in determining a similarity or relational proximity to other response user activity events, which may indicate a pattern (e.g., number of degrees a thermostat is turned up). In some embodiments, semantic information analyzer 262 may utilize a semantic knowledge representation, such as a relational knowledge graph. Semantic information analyzer 262 may also utilize semantic analysis logic, including rules, conditions, or associations to determine semantic information related to the response activity event. For example, a response activity event related to a user command "It's cold in here" comprising interacting with a smart thermostat may be characterized by how many degrees the thermostat is increased. Thus, when the smart thermostat is increased by two degrees in response to a failure state triggered by "It's cold in here" command, a pattern may be determined that the user activity corresponding to the "It's cold in here" command is increasing the smart thermostat by two degrees. Further semantic information, such as time of the year can also be used in determining a pattern. For instance, in the summer, the user activity corresponding to the "It's cold in here" command is increasing the smart thermostat by two degrees. However, in the winter, the user activity corresponding to the "It's cold in here" command is increasing the smart thermostat by four degrees.

Semantic information analyzer 262 may also be used to characterize contextual information associated with the response activity event, such as determining that a location associated with the activity response corresponds to a hub or venue of interest to the user (such as the user's home, work, gym, or the like) based on frequency of user visits. For example, the user's home hub may be determined (using semantic analysis logic) to be the location where the user spends most of her time between 8 p.m. and 6 a.m. Similarly, the semantic analysis may determine time of day that corresponds to working hours, lunchtime, commute time. Similarly, the semantic analysis may categorize the activity as being associated with work or home, based on other characteristics of the activity (e.g., playing classical music in response to a user command "Play music" at a location corresponding to the user's office may be determined to be work-related activity, whereas playing house music in response to a user command "Play music" at a location corresponding to the user's home may be determined to be home-related activity). In this way, the semantic analysis provided by semantic information analyzer 262 may provide other relevant features of the user activity events that may be used for determining response activity patterns. For example, where the user activity comprises playing classical music in response to the command "Play music," and the semantic analysis indicates that a user is at work, a response activity pattern may be determined (by response activity pattern determiner 266) indicating that the user wants classical music played at work in response to the user command "Play music" when at work.

Features similarity identifier 264 is generally responsible for determining similarity of activity features of two or more response activity events (put another way, activity features characterizing a first response activity event that are similar to activity features characterizing a second response activity event). The activity features may include features relating to contextual information and features determined by semantic information analyzer 262. Response activity events having in-common activity features may be used to identify a response activity pattern, which may be determined using response activity pattern determiner 266.

For example, in some embodiments, features similarity identifier 264 may be used to determine a set of response activity events that have in-common features. In some embodiments, this set of response activity events may be used as inputs to a response activity pattern determiner 266, as described below. In some embodiments, features similarity identifier 264 can comprise functionality for determining similarity of periodic- and behavioral-based activity features. Periodic features comprise, for example, features that may occur periodically; for example, features on a day of the week or month, even/odd days (or weeks), monthly, yearly, every other day, every $3^{rd}$ day. Behavior features may comprise behaviors such as user activities that tend to occur with certain locations or activities occurring before or after a given user activity event (or sequence of previous activity events), for example.

In embodiments where activity features have a value, similarity may be determined among different activity features having the same value or approximately the same value, based on the particular feature. (For example, a time stamp of a first response activity event happening at 9:01 a.m. on Friday and a time stamp of a second response activity event happening at 9:07 a.m. on Friday may be determined to have similar or in-common time stamp features.)

Response activity pattern determiner 266 is generally responsible for determining a response activity pattern based on similarities identified in response activity events. In particular, response activity pattern determiner 266 (or response activity patterns engine 260) may determine a response activity pattern based on repetitions of similar activity features associated with a plurality of observed response activity events. Thus, for example, a response activity pattern may be determined where activity features corresponding to two or more response activity events are similar. In some instances, a response activity event may have many corresponding activity features, which may be represented as a feature vector associated with a particular response activity event. Accordingly, the analysis carried out by response activity pattern determiner 266 may involve comparing the activity features from features vectors of a plurality of response activity events.

In some embodiments, response activity patterns may be determined using pattern inferences logic 230. Pattern inferences logic may include rules, associations, conditions, prediction and/or classification models, or pattern inference algorithms. The pattern inferences logic 230 can take many different forms depending on the particular response activity pattern or the mechanism used to identify a response activity pattern, or identify feature similarity among observed response activity events to determine the pattern that corresponds to performing a task associated with a user command. For example, some embodiments of pattern inferences logic 230 may employ machine-learning mechanisms to determine feature similarity, or other statistical measures to determine the response activity events belonging to a set of example response actions that support the determined response activity pattern, as further described below. The response activity information may be received from user activity monitor 280 and information about identified similar features may be received from features similarity identifier 264. In some embodiments, the response activity pattern(s) determined by response activity pattern determiner 266 may be stored as user-response activity patterns 248 in user profile 240. In further embodiments, the response activity pattern(s) determined by response activity pattern determiner 266 may be stored as response activity patterns 256 in response profile 250.

In some embodiments, response activity pattern determiner 266 provides a pattern of user activity (e.g., response activity event(s)) and an associated confidence score regarding the strength of the response activity pattern, which may reflect the likelihood that the response activity pattern satisfactorily performs the task associated with a particular user command More specifically, in some embodiments, a corresponding confidence weight or confidence score may be determined regarding a determined response activity pattern. The confidence score may be based on the strength of the pattern, which may be determined based on the number of observations (of a particular response activity event) used to determine a response activity pattern, how frequently the user's actions are consistent with the response activity pattern, the age or freshness of the response activity event observations, the number of similar features, types of features, and/or degree of similarity of the features in common with the response activity observations that make up the pattern, or similar measurements.

In some instances, the confidence score may be considered when generating response profiles (e.g., using response profile(s) generator 290). For example, in some embodiments, a minimum confidence score may be needed before using the response activity pattern to generate a response profile corresponding to a user command In one embodiment, a threshold of 0.6 (or just over fifty percent) is utilized such that only response activity patterns having a 0.6 (or greater) likelihood of performing a desired task by initiating the response activity event (as indicated by a response activity pattern) may be provided. Nevertheless, where confidence scores and thresholds are used, determined patterns of response activity with confidence scores less than the threshold still may be monitored and updated based on additional response activity event observations, since the additional observations may increase the confidence for a particular pattern.

Some embodiments of response activity pattern determiner 266 determine a pattern according to the example approaches described below, where each instance of a response activity event has corresponding historical values of tracked activity features (variables) that form patterns, and where response activity pattern determiner 266 may evaluate the distribution of the tracked variables for patterns. In the following example, a tracked variable for a response activity event is a time stamp corresponding to an observed instance of the response activity event. However, it will be appreciated that, conceptually, the following can be applied to different types of historical values for tracked activity features (variables).

A bag of time stamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the user-device interaction, such as:

$$h_{ij} = \Sigma_{m=1}^{M} I[\text{dayOfWeek}[t_m]=i] \wedge I[\text{hourOfDay}[t_m]=j].$$

This histogram can be used to determine derivative histograms. For example, a day of the week histogram may correspond to: $h_j = \Sigma_i h_{ij}$. An hour of the day histogram may correspond to: $h_i = \Sigma_j h_{ij}$. As further examples, one or more histograms may be determined for particular semantic time resolutions in the form of: $h_{iC} = \Sigma_{j \in C} h_{ij}$. Any of various semantic time resolutions may be employed, such as weekdays and weekends, or morning, afternoon, and night. An example of the latter is where C∈{morning, afternoon, night}, morning={9, 10, 11}, afternoon={12, 13, 14, 15, 16}, and night={21, 22, 23, 24}.

An additional data structure utilized in representing an event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the $2^{nd}$ three-week period of available time stamps. $N^{(j)}$ may be utilized to denote the number of j-week time stamps available in the tracked data; for example, $N^{(3)}$ denotes the number of three-week periods available in the time stamps.

Response activity pattern determiner 266 (or response activity patterns engine 260) may generate a confidence score that quantifies a level of certainty that a particular response activity pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For time stamps, examples include Tuesday at 9 a.m., a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_{i}^{K}(\alpha_0 + h_i)};$$

where K denotes the number of bins, $\alpha_0$ is a parameter encoding the strength of prior knowledge, and $$i^* = \underset{i}{\operatorname{argmax}} \, x_i.$$

Then, the pattern prediction is the bin of the histogram corresponding to i* and its confidence is given by $x_i^*$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit per week and 3 visits every 2 weeks. Using a Gaussian posterior, a confidence score may be generated for a pattern for every period resolution, denoted as j. This may be accomplished by employing the formula:

$$\widehat{\mu^{(j)}} = \lambda \left( \frac{1}{N^{(j)}} \sum_i^{N^{(j)}} w_i^{(j)} \right) + (1-\lambda)\mu_0, \text{ where } \lambda = \frac{\sigma^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$conf_j = P(|x - \widehat{\mu^{(j)}}| < a) = \int_{\widehat{u^{(j)}}-a}^{\widehat{u^{(j)}}+a} \mathcal{N}(x | \widehat{\mu^{(j)}}, \hat{\sigma}^{(j)}),$$

$$\text{where } \hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a response activity pattern exists, or that the confidence score for a response activity pattern is sufficiently high (e.g., satisfies a threshold value), response activity pattern determiner 266 may identify that a plurality of response activity events corresponds to a response activity pattern. As a further example, response activity pattern determiner 266 may determine that a response activity pattern is likely to perform the task desired in response to a user command where one or more of the confidence scores for one or more tracked variables satisfy a threshold value.

In some embodiments, patterns of response activities or patterns of response activity events may be determined by monitoring one or more activity features, as described previously. These monitored activity features may be determined from the data described previously as tracked variables or as described in connection to user-data collection component 210. In some cases, the variables can represent context similarities and/or semantic similarities among multiple user actions (response activity events). In this way, patterns may be identified by detecting variables or features in common over multiple user actions that occur following a failure state detected for a user command More specifically, features associated with a first user action following a failure state detected for a user command may be correlated with features of a second user action following a failure state detected for the user command to determine a likely pattern. An identified feature pattern may become stronger (i.e., more likely or more predictable) the more often the user activity observations following a failure state detected for a user command (or following the user command) that make up the pattern are repeated. Similarly, specific features can become more strongly associated with a response activity pattern as they are repeated.

In some embodiments, such as the example embodiment shown in system 200, response profile(s) generator 290 can use response activity patterns determined by response activity pattern determiner 266 to generate response profile(s) (e.g., stored as response activity patterns 256 and/or user-response activity patterns 248). At a high level, response profile(s) generator 290 can associate response activity patterns with a corresponding user command. In particular, a response profile(s) generator 290 can receive user activity information and/or activity features associated with a user activity and determines the user command that the user activity occurred in response to. In an embodiment, a response profile(s) generator 290 can include functionality, as further described below, for generating response profiles that are used to initiate one or more operations to perform the task in response to a user command (or similar commands) (e.g., by performing the user activity event(s) comprising to the user command) The response profiles generally include information associating command(s) with one or more specific operations to be performed to carry out the commands (or a task associated with the commands) In embodiments, such information may be universal and/or user-based. In another embodiment, such information may be specific to certain user devices (e.g., a particular brand smart thermostat).

In one embodiment, a response profile(s) generator 290 uses the features or patterns in common between historical user activities and a recent user activity determined by response activity pattern determiner. For example, a response activity pattern based on similarity of periodic features, from among a set of historical user actions, from those historical user actions having a periodic feature in common with a current or recent user action. Further, response profile(s) generator 290 can determine the user commands to perform as task correspond with the response activity pattern(s). For example, if a recent user action includes adjusting a thermostat following a user command ("I'm cold"), then determining behavior features similarity would comprise identifying those historical user actions that have features indicating the user adjusted a thermostat following a user command (the same or similar user command—"I'm cold," "It's cold in here," "Turn up the temperature").

To generate and/or update a response profile, response profile(s) generator 290 can select response action events from the subset of historical response action events that are most similar (or similar enough) to a particular current or recent user action event may be selected to determine a response activity pattern. In some embodiments, the selection process uses a similarity threshold, such as described above, to determine those historical response action events that satisfy the similarity threshold. (Although the term "selection" is used, it is contemplated that the selection is performed by a computer-related process that does not require a person to perform the selection.) The response activity pattern can be associated with a particular user command(s). For instance, the user commands, "I'm cold," "It's cold in here," "Turn up the temperature," can all be associated with the same task and carried out using the same response activity pattern based on a similarity threshold.

Example system 200 may also include storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 may include activity pattern inferences logic 230, as described previously, response actions 235, user profile 240, and response profile 250. One example embodiment of a user profile 240 is illustratively provided in FIG. 2. Example user profile 240 includes information associated with a particular user such as user activity information 242, information about user accounts and devices 244, user preferences 246, and user-response activity patterns 248. The information stored in user profile 240 may be available to the response activity pattern engine 260 or other components of example system 200.

As described previously, user activity information 242 generally includes user information about user actions or activity events, related contextual information, activity features, or other information determined via user activity monitor 280, and may include historical or current user activity information. User accounts and devices 244 generally includes information about user devices accessed, used, or otherwise associated with a the user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 244 may store information across one or more databases, knowledge graphs, or data structures. As described previously, the information stored in user accounts and devices 244 may be determined from user-data collection component 210 or user activity monitor 280 (including one of its subcomponents).

User preferences 246 generally include user settings or preferences associated with user activity monitoring. By way of example and not limitation, such settings may include user preferences about specific activities (and related information) that the user desires be explicitly monitored or not monitored or categories of activities to be monitored or not monitored, crowdsourcing preferences, such as whether to use crowdsourced information, or whether the user's activity pattern information may be shared as crowdsourcing data; preferences about which activity pattern consumers may consume the user's activity pattern information; and thresholds, and/or notification preferences, as described herein. As described previously, user-response activity patterns 248 may include one or more user pattern(s) generated by response profile(s) generator 290 based on response activity pattern(s) determined by response activity pattern determiner 266, and may also include confidence scores associated with the patterns and/or information related to the activity patterns, such as contextual information or semantic information. User-response activity patterns 248 includes personalized user-response activity patterns content determined from content personal to a user, such as response activity patterns unique to the user. For example, a user command "Activate my room" corresponds to a personalized user-response activity pattern comprising response activities including turning on lights in an office, increasing the temperature in office by two degrees, turning on a TV in the office at volume 20.

As shown in example system 200, storage 225 includes activity pattern inferences logic 230, as described previously, response actions 235, user profile 240, and response profile 250. One example embodiment of a response profile 250 is illustratively provided in FIG. 2. In this example, response profile 250 includes information associated with responses and/or user commands, such as response commands 252, device mappings 254, response activity patterns 256, and user feedback/weighting 258. In an embodiment, the response and/or user commands 252 in response profile 250 can be universal (i.e., capable of carrying out operations on one or more different devices to perform the same or similar task). In another embodiment, the response and/or user commands in response profile 250 can be specific to one user or user device(s) (e.g., specific to only users with a particular smart thermostat). In implementations, the information stored in response profile 250 may be available to the response activity pattern engine 260 or other components of example system 200.

Response profile 250 may generally include one or more user commands and corresponding operations to be performed to carry out a task associated with the command Such corresponding operations can be, for example, response activity events and/or a response activity pattern that corresponds to a user command. In implementations, a response profile can contain a user command, an associated response activity event(s), and/or an associated task (in any combination). In other embodiments, a response profile may further include user-device mappings that enable the operations to be performed on different types of user devices (e.g., various brands of user devices that perform the same/similar actions—smart thermostats).

In some embodiments, a response profile may be determined from learned user activity. Such user activity may be learned from a plurality of users. For instance, a response profile (corresponding to a particular user command) can be associated with response activity events. This response profile can further be associated with a task based on a history of sensed user activity related to the user command (e.g., obtained during a monitoring mode of operation). For example, without limitation, response profile(s) may be generated based on determined patterns of response activity events regarding desired interactions (e.g., response activity event(s)) associated with one or more user devices that correspond to a task in response to a user command, and used to provide improved user experiences. From response activity information, a computer system may learn response activity events that correspond to the user command and are associated with user activity related to the user device(s) that carry out the task (from the user command).

In embodiments, when an indication of a user command is received in the future, response profile 250 can be used to determine response activity event(s) associated with a task related to the user command. In such an embodiment, the response activity event(s) can be used to cause an operation to be performed to carry out the task (e.g., using one or more user devices). In implementations, response activity patterns, or the response profiles generated therefrom, may be made available to one or more applications and services that consume this information to provide an improved user experience of interacting with a computing device, or the digital assistant applications operating thereon (e.g., understanding previously unknown user commands and causing an operation to be performed to carry out the task associated with the user command) For example, in one embodiment, the response activity pattern information and/or generated response profiles may be provided via an API so that third-party applications and services can use it, such as by determining and/or providing device mappings, suggestions or other information or services relevant to users based on the learned response activity patterns. In some embodiments, the response profile may further include user-device mappings that specify how the operations are be performed based on different types of user devices, such as different smart brands of smart lights or smart thermostats. For example, a response profile may specify one or more user commands and corresponding operations (for a one or more specific user devices) to be performed to carry out a task associated with the command.

As described previously, response commands 252 generally include user command(s), which may indicate or correspond to a particular task desired to be performed by a user making the command. In some embodiments, response commands can include a set of user commands having corresponding response activity patterns (or response actions that may be determined from the response activity patterns) for performing operations to carry out the task. Thus user commands can correspond with initiating a one or more actions by one or more user devices to perform the task. For example, the command "It's cold in here" may correspond with the task of increasing the temperature by a number of degrees on a smart thermostat.

Device mappings 254 generally includes information about user devices accessed, used, or otherwise associated with a response, and/or information related to a device associated with the response activity. Some embodiments of device mappings 254 may store information across one or more databases, knowledge graphs, or data structures. As described previously, the information stored in device mappings 254 may be determined from user-data collection component 210 or user activity monitor 280 (including one of its subcomponents). In particular, device mappings 254 can correlate response commands and corresponding response activity patterns across various user devices. Device mappings can be provided by a company, a user, and/or some combination of the two.

In embodiments, device mappings 254 may be utilized to teach a previously unknown user command to a specific user device. For instance, a first user device has functionality that understands a user command of "Increase the temperature" results in the task of turning up a smart thermostat by two degrees. A second user device that does not inherently have functionality to understand the user command "Increase the temperature," can learn this response activity pattern from the user command and response activity patterns pairing (e.g., from response actions 235). In this way, in embodiments, a specific user device can learn from device mappings 254 to perform a task (e.g., via response activity initiator 299) even when the specific user device does not previously understand the user command.

In further embodiments, device mappings 254 can translate a user command to apply the corresponding task to a specific user device. For instance, various user devices might implement a response activity pattern in different manners to perform the same task. Device mappings 254 can associate a general command (e.g., from the response activity pattern) to a specific action (corresponding to the response activity pattern) for a specific user device. For instance, if the task is to turn up the temperature, one type of smart thermostat turns up the temperature using a one operation where as another type of smart thermostat turns up the temperature using a different type of operation. In an embodiment, device mappings 254 ensures that a specific user device is able to understand how to implement a response activity pattern on the specific device.

Response activity patterns 256 generally include response activity patterns associated with user commands (e.g., response commands 252). In particular, the response activity patterns stored in response activity patterns 256 can include both specific patterns and general or universal patterns (e.g., response activity patterns applicable to a group of users). As described previously, response activity patterns 256 may include one or more response activity pattern(s) determined by response activity pattern determiner 266, and may also include confidence scores associated with the patterns and/or information related to the activity patterns, such as contextual information or semantic information. Response activity patterns may specify a set of operations to be performed in response to a user command, as described previously, and which may be specified in response commands 252. In particular, as described herein, this set of operations comprises the operations that were "learned" from the monitored user activity that determined the response pattern. In some embodiments, the set of operations may comprise only a single operation, and in other embodiments, the set of operations may comprise a series or sequence of operations to be performed.

In some embodiments, the set of operations may also include prompting the user for input regarding certain variables or options associated with an operation. By way of example, for a user command to "Make a restaurant reservation," if the user has not provided a specific restaurant, cuisine, or similar information, then upon performing the operations learned from the user activity responses to this command, the system may ask the user, e.g., "Is there a particular restaurant where you'd like to make the reservation?" Or similarly, "Is there a particular cuisine you'd prefer for your dinner reservation?" Or further still, "Is there a particular time you'd prefer for the dinner reservation?" In some embodiments, these prompts may be learned as well, such as wherein a response activity pattern shows a strong pattern for a particular operation feature type or category (e.g., launching a particular app or contacting a particular website, such as the OpenTable app, which is used making restaurant reservations) but the feature's values (i.e., parameter values) of for that feature type are varied (e.g., have a high variance or divergence). In other words, the response activity pattern shows that certain operations are always performed (e.g., launching a restaurant reservations app) but the settings or values associated with those operations vary (e.g., the specific restaurant selected in the app varies). Thus where aspects of an operation to be performed show variance or divergence among the user response patterns, then the user may be prompted for input regarding that operation.

In some embodiments, a weighting may be applied to a response activity pattern. For example, user feedback may indicate that a particular response activity pattern (or more generally a particular response profile 250) is good (e.g., correct) or bad (e.g., incorrect, incomplete, or buggy). This feedback (and/or the weighting) may be utilized by the system to determine whether it should continue to learn response actions for a particular command, or whether responding to the command may have been sufficiently learned. (For instance, if user feedback is positive, then it may be inferred that the system's response to the user command is satisfactory to the user.) Additionally, the feedback or weighting may be utilized to rank available response profiles. In particular, in some embodiments where response profiles are made available to other users, it is contemplated that multiple response profiles may be created for the same or similar commands Therefore, user feedback may be utilized to score or rank the response profiles so that those having a higher score or weighting are more likely to be utilized. Accordingly, a response profile 250 may include user feedback/weighting 258, which may represent a weighting applied to a particular response profile 250 or response activity pattern 256.

In some embodiments, a corresponding confidence weight or confidence score may be associated with a response activity pattern. A confidence score may be based on the strength of a response pattern. In some instances, the confidence score may be based on the number of observations (of a particular response activity event) used to determine a response activity pattern, how frequently the user's actions are consistent with the response activity pattern, the age or freshness of the user activity observations, the number of similar features, types of features, and/or degree of similarity of the features in common with the response activity observations that make up the pattern, or similar measurements.

In some instances, the confidence score may be considered when generating response profiles (e.g., using response profile(s) generator 290). For example, in some embodiments, a minimum confidence score may be needed before using the response activity pattern to generate a response profile corresponding to a user command In one embodiment, the number of times a response activity pattern is established can indicate the strength of the response activity pattern. For instance, if the response activity pattern corresponding to the user command "I'm cold" is to perform the task of turning up a thermostat has been determined 10,000 times (e.g., for 10,000 users and/or instances of the user command "I'm cold"), the response activity pattern is relatively strong. On the other hand, if the response activity pattern corresponding to the user command "I'm cold" is to perform the task of turning up a thermostat has been determined two times (e.g., for two users and/or instances of the user command "I'm cold"), the response activity pattern is relatively weak. Nevertheless, even where confidence scores and thresholds are used, determined patterns of response activity with confidence scores less than the threshold still may be monitored and updated based on additional response activity event observations, since the additional observations may increase the confidence for a particular pattern.

In further instances, direct feedback can be obtained from a user. For instance, upon detection of a failure state (e.g., determined by failure state detector 270), a user device can ask a user for clarification. In particular, in one embodiment, when a user command, "I'm cold" triggers a failure state by a user device (e.g., failing to turn up the temperature using a smart thermostat), the user device can ask the user for clarification and/or feedback. Clarification and/or feedback can include a direct question to the user such as: "Do you want me to turn up the temperature? I understand you are cold." In some implementations, a user's answer to such a direct question (e.g., yes or no) can be used to weight the response activity pattern. For instance, if the user answers, "Yes," then a response activity pattern that turns up the temperature can be more heavily weighted to indicate a strong confidence score. If the user answers, "No," then a response activity pattern that turns up the temperature can be more heavily down-weighted to indicate a lower confidence score.

In some embodiments, direct feedback observed from a user can also be in response to an action by the user device. For instance, if a user command, "I'm cold" results in the user device turning on hallway lights, the user can state, "I said I'm cold, not turn on the light." Such a statement can be used to determine the performed response activity event (e.g., turning on the light) was not correct (did not correctly perform the task associated with the user command) In such a case, the response activity event of turning on the light in response to the user command, "I'm cold," can be down-weighted.

Response profiles can be generated, in some embodiments, by associating response activity patterns (e.g., from response activity patterns 256) with user commands (e.g., response commands 252) can be stored in response actions 235. Response actions 235 can be a set or library of responses (e.g., response activity patterns to perform a task) associated with user commands In other embodiments, response actions 235 can be stored as a list or dataset. In this way, by way of example and not limitation, response actions 235 can map associations between various user commands and various actions performed by one or more user device to perform tasks corresponding to the user commands In implementations, an initial state, response actions 235 can contain, for example, out-of-the-box response profiles. In some embodiments, the out-of-the-box response profiles can be pre-programed response activities. Response actions 235 can also generally contain learned response profiles (e.g., generated by response profile(s) generator 290). Learned profiles may be added by monitoring user actions in response to user command absent from response actions 235. For example, when a user command is absent from response actions 235, a failure state can be triggered (at failure state detector 270). From the user actions monitored (e.g., using user activity monitor 280) after initiating of the failure state response activity patterns can be determined (e.g., using response activity patterns engine 260). In some of these embodiments, such a response activity pattern can be associated with a task performed by one or more user devices in response to a received indication of a user command to generate a response profile (e.g., using response profile(s) generator 290). This response profile can be added to response actions 235. In this way, in embodiments, when future indications of a user command are received that correspond to the response profile, the response profile can be used to perform the desired task in response to the user command.

Response activity initiator 299 generally initiates one or more tasks in response to a user command. The one or more tasks can be based on response activity patterns (e.g., response activity patterns 256 and/or user-response activity patterns 248) associated with the user command (stored in response actions 235). In embodiments, response activity initiator 299 can choose what response activity(ies) to initiate based on a confidence strength of a response activity pattern(s) associated performing the task based on the indication of the user command. For instance, a minimum confidence score may be needed before response activity initiator 299 initiates a response activity pattern. For example, in one embodiment, a threshold of 0.6 (or just over fifty percent) is utilized such that only response activity patterns having a 0.6 (or greater) likelihood of corresponding with a desired task may be considered.

Example system 200 also includes a presentation component 220 that is generally responsible for presenting content and related information to a user, such as the content related to user feedback. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented, when it is presented. In particular, in some embodiments, presentation component 220 applies content logic to device features, associated logical hubs, inferred logical locations, or sensed user data to determine aspects of content presentation. For instance, clarification and/or feedback request can be presented to a user via presentation component 220.

In some embodiments, presentation component 220 generates user interface features associated with the clarification and/or feedback request. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some embodiments, a personal assistant service or application operating in conjunction with presentation component 220 determines when and how (e.g., presenting when the user is determined to be at a specific logical location) to present the content. In such embodiments, the content, including content logic, may be understood as a recommendation to the presentation component 220 (and/or personal assistant service or application) for when and how to present the notification, which may be overridden by the personal assistant app or presentation component 220.

Figure 3B:
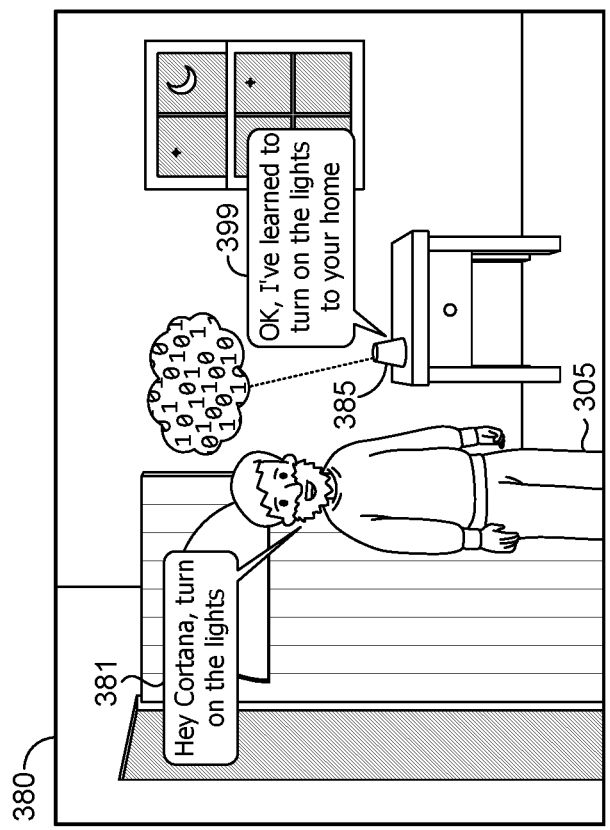
FIG. 3B depicts an example voice-based interaction between a user and a computing system, in accordance with an embodiment of this disclosure.

Turning now to FIG. 3B, another example embodiment of the technologies described herein is illustratively provided. The example embodiment shown in FIG. 3B contrasts the example conventional interaction depicted in FIG. 3A. In particular, the same user 305 is shown interacting with a smart speaker 385 (an example of a user device, with a digital assistant application operating thereon) in scene 380. However, in contrast to the outcome in the example of FIG. 3A, in FIG. 3B, the smart speaker 385 is able to perform the task indicated by user command 381 ("Hey Cortana, turn on the lights"). In particular, in scene 380, the smart speaker 385 responds 399 by letting the user known that it had learned to turn on the lights to the home.

In this example, following the user command 381, the smart speaker 385 can check user command 381 against a library and/or set of known (pre-determined) commands. The smart speaker 385 (or a digital assistant or computer program running on it) then determines at least a response activity event and/or response activity pattern that is associated with the task and/or the user command. Here, the response activity event and/or response activity pattern is determined to be one or more operation by one or more smart lights in the user's home to turn on the lights.

As further described herein, in some embodiments of the example depicted in FIG. 3B, the user device (e.g., smart speaker 385) or the digital assistant application operating thereon may learn to respond to the command 381 "Turn on the lights" by monitoring the user activity of user 305. In another embodiment, and as further described herein, smart speaker 385 (or the digital assistant application operating thereon, may learn to respond to the command 381 by receiving updated instructions. For instance, smart speaker 385 may access a server of response profiles (or may receive additional response profiles via a device update procedure) thereby enabling the smart speaker 385 to respond to the user command 381. The response profile may have been generated from monitoring the user activity of other users making the same or similar command. In this way, smart speaker 385 (or a similar user device having a digital assistant application operating thereon) may be enabled to correctly respond to a user command on the first instance of a user providing the command, because the device has effectively learned from other users. Although the example embodiment of FIG. 3B is implemented on a smart speaker, it is contemplated that this embodiment, and any of the smart speaker embodiments described herein, may be implemented using a digital assistant running on a user device (such as a user's mobile computing device, or other user device 102a, as described in FIG. 1).

Figure 4:
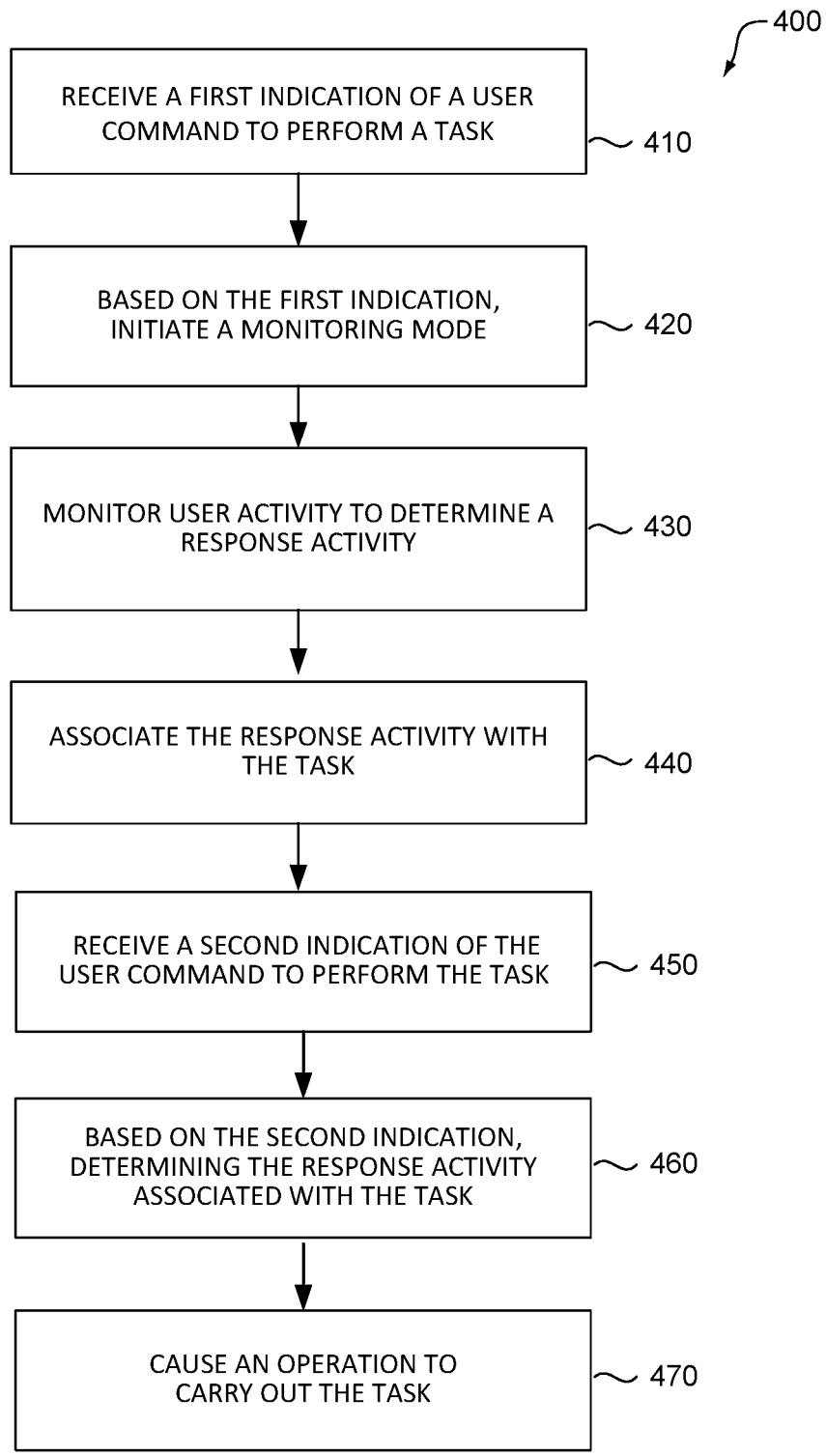
FIGS. 4 and 5 each depict a flow diagram of a method for a computing system to expand its functionality by learning to perform new tasks associated with user commands based on monitoring user activity, in accordance with an embodiment of the present disclosure.
Figure 5:
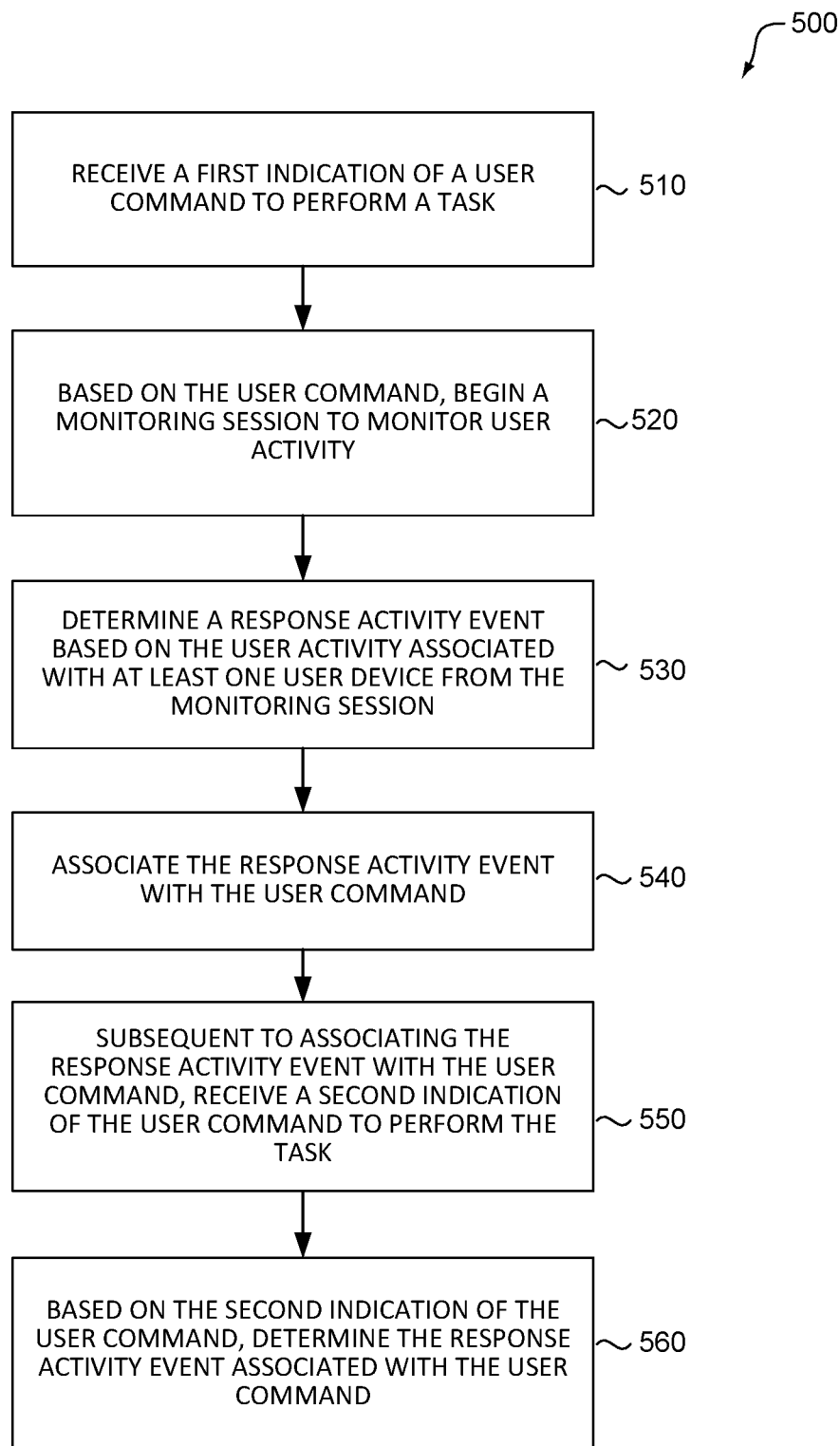

Turning now to FIGS. 4 and 5, aspects of an example process flows 400 and 500 are illustratively depicted for embodiments of the disclosure. Process flows 400 and 500 each may comprise a method (sometimes referred to herein as method 400 and method 500) that may be carried out to implement many of the example embodiments described herein. For instance, process flow 400 or process flow 500 may be utilized to facilitate a computing system learning to associate unknown user commands with the appropriate tasks, such as to perform a task (using device operations) desired by the user based on a user command.

An overview of process flow 400 and process flow 500 is depicted in FIGS. 4 and 5, respectively, and the blocks of process flow 400 and 500 that correspond to actions (or steps) to be performed (as opposed to information to be acted on) may be carried out by one or more computer applications or services, in some embodiments, including a digital assistant, that operate on one or more user devices (such as user device 104a), servers (such as server 106), may be distributed across multiple user devices and/or servers, or may be implemented in the cloud. In one embodiment, the functions performed by the blocks or steps of process flows 400 and 500 are carried out by components of system 200, described in connection to FIG. 2.

Turning to FIG. 4, a flow diagram is provided illustrating one example method 400 for determining a response activity event associated with performing a task indicated in a user command. At step 410, a first indication of a user command to perform a task can be received. A user command can be characterized as a voice command, a gesture, and so on. A task can be associated with a user command. Such a task can be carried out by one or more of a user's computing devices. For example, when the user command is "Turn up the thermostat," the task of turning up the thermostat can be carried out by one or more of the user's computing devices. In some embodiments, the first indication of a user command received in step 410 may be received by a user-interactive computing device. The user-interactive computing device can receive the first indication of a user command from a sensor, such as sensor 103, described in connection to FIG. 1.

At step 420, the first indication of the user command can be used to initiate a monitoring mode of operation. Embodiments of step 420 can initiate a monitoring mode of operation upon determining that a user command does not correspond to a pre-determined response action. A pre-determined response action can correspond with performing a task by initiating an operation by one or more user devices (including the user-interactive computing device that received the first indication of the user command) These pre-determined response actions can be stored as a list, library, and/or in a database. Pre-determined response actions can be stored, for example, in response actions 235, described in connection with FIG. 2. The user command can be checked against a set pre-determined response actions to determine that there is no corresponding action or operation to be performed for the particular user command.

In response to determining that the user command does not correspond to a pre-determined response action, the user-interactive computing device can enter a failure state. In particular, a failure state can occur when an indication of a user command is received, such as, for example, at step 410, and the user command does not correspond to a pre-determined response action. When the user-interactive computing device enters the failure state, a monitoring mode of operation can be initiated. A failure state can be detected using, for example, failure state detector 270, described in connection to FIG. 2.

At step 430, user activity can be monitored to determine a response activity. Embodiments of step 430 monitor user data associated with at least one user device, to identify or detect a user activity (sometimes referred to herein as a user action) that occurs subsequent to the received first indication of the user command User activity can be monitored using sensor data, using information about user devices associate with the user.

In one embodiment, at step 430, information detected via one or more user devices used by the user and/or cloud-based services associated with the user, can be analyzed to determine activity information and related contextual information. Information about user devices associated with a user may be determined from the user data made available via, for example, user-data collection component 210, and may be provided to, for example, user activity monitor 280, both described in connection to FIG. 2. Monitored user data can provide information that may be used for determining user activity with one or more devices, which may include identifying and/or tracking features or other information regarding specific user actions and related contextual information.

In one embodiment, user-activity performed on at least one device may be determined from user data made available via user-data collection component 210, such as described in connection to user activity monitor 280 of FIG. 2. For example, as described previously, information about a user device may be sensed or otherwise detected from user data, such as by one or more sensors associated with a user device, or may be determined by detecting and analyzing user-device related information in user data to determine characteristics of the user device, such as device hardware, software such as OS, network-related characteristics, user accounts accessed via the device, and similar characteristics. In one embodiment, the detected user devices (such as user devices 102a through 102n) may be polled, interrogated, or otherwise analyzed to determine information about the devices. In some implementations, this information may be used for determining a label or identification of the device (e.g., a device ID) so that the user interaction with one device may be recognized from user interaction on another device. In some embodiments of step 410, a user device may be inferred based on the user command, such as the case where the task of the user command is performed by a particular device, for example, a user command associated with a task related to temperature can infer the user device is a smart thermostat, a user command associated with a task related to playing music can infer the user device is a smart speaker.

Some embodiments of step 430 may monitor user activity using at least one sensor. In particular, user activity can be monitored based on sensor data from one or more sensors associated with a set of user devices to determine performed user-activity. Some implementations of step 430 may be carried out using a user activity monitor 280, such as described in system 200 of FIG. 2. Further, some embodiments of step 430 may use activity event logic to detect a response activity event, as described in connection to user activity detector 282. Additional details of embodiments of step 420 are provided in connection with user activity monitor 280 in FIG. 2.

Embodiments of step 430 use monitored user data associated with at least one user device, to identify or detect a user-activity (sometimes referred to herein as a user action) that occurs subsequent to the received first indication of the user command Identified user-activity can be used to determine a response activity event. In some instances, a response activity event may comprise a series or sequence of user action and/or interactions with one or more user devices. A response activity event may comprise at least one user-activity performed on at least one user device associated with a task (e.g., a user manually performing user-activities comprising a response activity event that causes a desired task to be performed using one or more user device)

At block 440, a response activity event can be associated with a task. From user-activity information (e.g., user-activity performed on at least one user device, monitored at block 430), a computer system may associate a response activity event that with a task (from the user command). In embodiments, a response activity event can be associated with a task related to one or more user devices. The task can be based on performing the response activity event on the one or more user devices. In some embodiments, block 440 also may include associating the response activity with the user command or associating the task with the user command.

In embodiments, at block 440, a record of the association of the response activity event and the task can be stored in a data store. The data store may comprise a plurality of records about activity events, wherein each record may include information about a particular activity event including one or more activity features associated with the activity event. In some embodiments, the plurality of records in the activity event data store comprise records of other activity events determined according to steps 410 through 430 of method 400. In some instances, some of the other records may include information about activity events (including associated activity features) derived from other users determined to be similar to the particular user, as described previously. In an embodiment, the data store comprises a user profile, and may be stored in a user activity information component, such as user activity information component 242 of user profile 240 described in connection to FIG. 2. In another embodiment, the data store comprises a response profile, and may be stored in a response activity information component, such as response profile 250 described in connection to FIG. 2.

In embodiments, the plurality of records of the associations of response activity events and the task can be analyzed to determine a response activity pattern. This response activity pattern can be utilized to determine the operation to be performed to carry out the task. A response activity pattern can be associated with, or used to generate, a response profile that corresponds to the user command, and is associated with the task based on a history of sensed response activity event(s) (comprising the response activity pattern). In this way, when an indication of a user command is received in the future, the response activity event(s) associated with the task can be determined (using the response profile) and used to cause an operation to be performed to carry out the task.

In an embodiment, a response profile can be stored and made available to other user-interactive computing devices (e.g., response actions 235, described with reference to FIG. 2). For instance, response profiles can be published on a server that is accessible to other user-interactive devices. Stored response commands can include a list of one or more user commands having known response activity patterns for performing operations to carry out the task. A published response profile can also include an indication of at least one user device determined based on monitoring user activity. Published response profiles can allow a specific user device can learn to perform a task even when the specific user device does not previously understand the user command (e.g., using device mappings 254, as discussed with reference to FIG. 2). In some embodiments, a cloud system (such as the cloud system described above) and/or a cloud service may be utilized to perform method 400 so as to provide an improved or enhanced user experience (such as published response profiles) to multiple services, which may be running on many different user devices.

At step 450, a second indication of the user command to perform the task can be received. The user command and the task in step 450 may be the same or similar to the user command and the task of step 410. A similar user command can result in the same task as the user command (e.g., "I'm cold," "It's cold in here," "Turn up the temperature," all result in the task of turning up the temperature). In some embodiments, the second indication of the user command received in step 450 may be received by the user-interactive computing device that received the first indication of the user command in step 410. In other embodiments, the second indication of the user command received in step 450 may be received by a different user-interactive computing device than the one that received the first indication of the user command in step 410. The second indication of the user command can be received from a sensor, such as sensor 103, described in connection to FIG. 1. Thus, embodiments of step 450 may receive a second indication of a user command to perform the task that is indicated by the first indication, which was received in step 410. Additionally, embodiments of step 450 may be performed subsequent to step 440, which as described above may associate a response activity event with the task.

At step 460, based on the second indication of the user command, the response activity event associated with the task can be determined. The response activity event may be determined based a pre-determined response action stored as a list, library, and/or in a database. For instance, the pre-determined response action can be based on the association of the response activity event with the task at step 440. Pre-determined response actions can be stored, for example, in response actions 235, described in connection with FIG. 2. The second indication of the user command can be checked against a set pre-determined response actions (e.g., response actions 235, described with reference to FIG. 2).

At step 470, an operation can carry out the task. In embodiments, a response activity event, as determined at step 470, can indicate operations to perform for carrying out the task associated with the indication of the user command. For example, some embodiments may cause an operation to perform a response activity event associated with one or more user computing devices (in response to a received user command) In some embodiments, the operations to perform the task in response to a user command can be based on a response profile (universal or user-based) that are used to initiate a task on one or more devices.

With reference now to FIG. 5, a flow diagram is provided illustrating one example method 500 for determining a probable future user action based on a pattern of user activity. At step 510, a first indication of a user command to perform a task may be received. The first indication of the user command may be received as described previously with reference to FIG. 2 or 4. In an embodiment, the first indication of a user command may be received by a user-interactive computing device. The user-interactive computing device can receive the first indication of a user command from a sensor, such as sensor 103, described in connection to FIG. 1.

At step 520, a monitoring session may begin. The monitoring session may be determined to be initiated based on the user command indicated in step 510. For instance, embodiments of step 420 can initiate a monitoring mode of operation upon determining that a user command does not correspond to a pre-determined response action. A pre-determined response action can correspond with performing a task by initiating an operation by one or more user devices (including the user-interactive computing device that received the first indication of the user command). In response to determining that the user command does not correspond to a pre-determined response action, the user-interactive computing device can enter a failure state (i.e., because the user command is not recognized as explained in connection to the failure state detector 270 in FIG. 2). The monitoring session can be performed as previously described with reference to FIG. 2 or 4.

At step 530, a response activity event may be determined. In embodiments, the response activity event may be determined based on user activity associated with at least one user device from the monitoring session. Determining a response activity event based on a user activity associated with a user device from a monitoring session can be carried out as previously described with reference to FIG. 2 or 4. At step 540, the response activity event can be associated with the user command. For example, the response activity events may be monitored, tracked, and used for determining response activity patterns associated with the user command A response activity pattern may refer to a plurality of user interactions with one or more user devices, activity by the user on or in connection to one or more user devices, events (including actions) related to user activity, or any type of response activity event determinable via a computing device, wherein the plurality of interactions, actions, events, or activity share common features or characteristics.

In some embodiments, step 540 may also determine a confidence score for associating the response activity event (e.g., based on a response activity pattern) with the user command indicating the response activity event is associated with the task (of the user command) For example, the confidence score may be based on the strength of the pattern, which may be determined by the number of observations used to determine a pattern, how frequently the response activity event(s) is consistent with the pattern, the age or freshness of the activity observations, the number of features in common with the response activity event(s) observations that make up the pattern, or similar measurements. In some instances, the confidence score may be considered when providing a personalized user experience or other improved user experience. Further, in some embodiments, a minimum confidence score may be needed before using the response activity pattern to provide such experiences or other services. For example, in one embodiment, a threshold of 0.6 (or just over fifty percent) is utilized such that only response activity patterns having a 0.6 (or greater) likelihood of performing the desired task corresponding to a user command are used to initiate a response activity event that performs the task. Nevertheless, where confidence scores and thresholds are used, determined response activity patterns of response activity event(s) with confidence scores less than the threshold may still be monitored since additional observations of response activity event(s) may increase the confidence for a particular pattern.

In some embodiments, a response activity event can be characterized semantic information such as time, location, or other contextual information associated with the response activity event, as further described herein. Examples of response activity event corresponding with a user command associated with time (e.g., the user command "Turn on lights" at 7:00 a.m. relates to the response activity pattern of turning on master bedroom lights, master bathroom lights, and kitchen lights, as opposed to, the user command "Turn on lights" at 5:30 p.m. relates to the response activity pattern of turning on kitchen lights, living room lights, and dining room lights), location (e.g., the user command "Play music" when at work relates to the response activity pattern of playing classical music, as opposed to, the user command "Play music" when at home relates to the response activity pattern of playing house music), content (e.g., the user command "It's a little chilly in here" relates to the response activity pattern of turning up a smart thermostat by two degrees, as opposed to, the user command "I'm freezing" relates to the response activity pattern of turning up a smart thermostat by four degrees), or other context, as described herein.

At step 550, a second indication of the user command to perform the task can be received. In embodiments, the second indication of the user command can be received subsequent to associating the response activity event with the user command. The second indication of the user command may be received as described previously with reference to FIG. 2 or 4. In embodiments of step 550, the same and/or similar user command as received at step 510 can be received. In some embodiments, the second indication of the user command received in step 550 may be received by the user-interactive computing device that received the first indication of the user command in step 510. In other embodiments, the second indication of the user command received in step 550 may be received by a different user-interactive computing device than the one that received the first indication of the user command in step 510. The second indication of the user command can be received from a sensor, such as sensor 103, described in connection to FIG. 1.

At step 560, the response activity event associated with the task can be determined. Determining the response activity event associated with the task can be performed as described previously with reference to FIG. 2 or 4. The response activity event may be determined based on the received second indication of the user command In embodiments, the response activity event may be determined based on a pre-determined response action stored as a list, library, and/or in a database. For instance, the pre-determined response action can be based on the association of the response activity event with the task at step 540. Pre-determined response actions can be stored, for example, in response actions 235, described in connection with FIG. 2. The second indication of the user command can be checked against a set pre-determined response actions (e.g., response actions 235, described with reference to FIG. 2).

Figure 6:
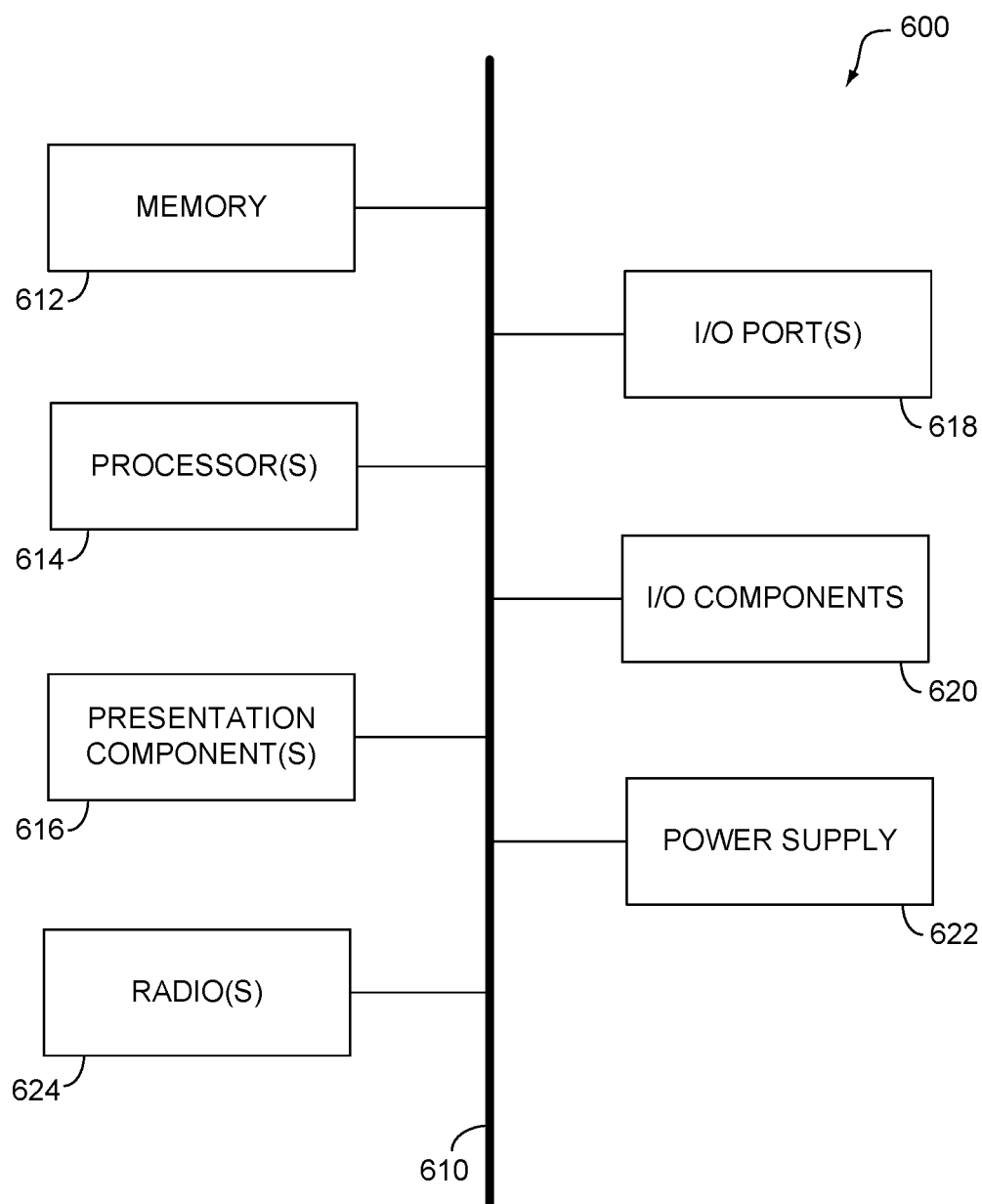
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O (I/O) components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives. Computing device 600 includes one or more processors 614 that read data from various entities such as memory 612 or I/O components 620. Presentation component(s) 616 presents data indications to a user or other device. In some implementations, presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB-camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Accordingly, in one aspect, an embodiment of the present disclosure is directed to a computerized system comprising one or more sensors configured to provide sensor data; one or more processors; and computer storage memory having computer-executable instructions stored thereon which, when executed by the processor, implement a method. The method includes receiving a first indication of a user command to perform a task; based on the first indication of the user command, determining to initiate a monitoring mode of operation; subsequent to associating the response activity event with the task, receiving a second indication of the user command to perform the task; based on the second indication of the user command, determining the response activity event associated with the task and causing an operation to be performed to carry out the task.

In some embodiments of this system, the monitoring mode comprises monitoring, using the at least one sensor, user activity to determine a response activity event comprising at least one user-activity performed on at least one user device; and associating the response activity event with the task. Further, in some embodiments, determining to initiate the monitoring mode of operation comprises, by way of example and not limitation, determining that the user command does not correspond to a pre-determined response action to be initiated by the user-interactive computing device; and in response to determining that the user command does not correspond to a pre-determined response action, causing the user-interactive computing device to enter a failure state wherein the user-interactive computing device is operable to learn a new response action based on the monitoring, using the at least one sensor, of the user-activity occurring subsequent to the received first indication of the user command.

In another aspect, an embodiment of the present disclosure is directed to a computerized system comprising one or more sensors configured to provide sensor data, each sensor associated with a user device in a set of user devices associated with a user; one or more processors; and computer storage memory having computer-executable instructions stored thereon which, when executed by the processor, implement a method. The method includes: receiving a first indication of a user command to perform a task; based on the first indication of the user command, determining to initiate monitoring; monitoring user-activity to determine a response activity event comprising at least one user-activity performed on at least one user device; determining a response activity event based on the user-activity; associating the response activity event with the task; subsequent to associating the response activity event with the task, receiving a second indication of a user command to perform the task; based on the second indication of the user command, determining the response activity event associated with the task; and causing an operation to be performed to carry out the task.

In yet another aspect, an embodiment of the disclosure is directed to a computerized method. The method comprises, receiving a first indication of a user command to perform a task; and based on the user command, beginning a monitoring session to monitor user-activity associated with at least one user device. The method also comprises, determining a response activity event based on the user-activity associated with the at least one user device from the monitoring session; and associating the response activity event with the user command. Further the method comprises, subsequent to associating the response activity event with the user command, receiving a second indication of the user command to perform the task; based on the second indication of the user command, determining the response activity event associated with the user command; and based on the response activity event, causing an operation to be performed to carry out the task.

What is claimed is:

1. A user-interactive computing device, comprising:
one or more processors; and
computer storage memory having computer-executable instructions stored thereon which, when executed by the one or more processors, implement a method comprising:

receiving a first indication of a user command to perform a task;
determining that the user command is unrecognized;
based on the user command being unrecognized, triggering a heightened level of monitoring as compared to a level of monitoring when the first indication is received, the heightened level of monitoring comprising:
monitoring user-activity to determine a first response activity event comprising at least one user-activity operation performed by a user on at least one user device;
determining first contextual information associated with the first response activity event; and
associating the first response activity event, comprising the at least one user-activity operation performed by the user, with the task, wherein associating the first response activity event with the task comprises associating the first contextual information with the first response activity event, and wherein the first contextual information distinguishes between the first response activity event associated with the user command and a second response activity event associated with the user command;
subsequent to associating the first response activity event with the task, receiving a second indication of the user command to perform the task;
determining current contextual information;
based on the second indication of the user command, the first contextual information, and the current contextual information, determining the first response activity event, comprising the at least one user-activity operation performed by the user, associated with the task; and
causing the at least one user-activity operation to be performed to facilitate carrying out the task.

2. The user-interactive computing device of claim 1, wherein the method further comprises:
storing in a data store, a record of the association of the first response activity event and the task;
based on an analysis of a plurality of records of associations of response activity events and the task, determining a response activity pattern comprising a plurality of associations of the task and the at least one user-activity operation performed; and
utilizing the response activity pattern and the second indication of the user command to determine the first response activity event associated with the task.

3. The user-interactive computing device of claim 2, wherein the method further comprises:
generating a response profile based on the determined first response activity pattern.

4. The user-interactive computing device of claim 3, wherein the method further comprises:
storing the response profile to be available to other user-interactive computing devices.

5. The user-interactive computing device of claim 4, wherein storing the response profile to be available to other user-interactive devices comprises:
publishing the response profile on a server that is accessible to the other user-interactive devices.

6. The user-interactive computing device of claim 5, wherein the method further comprises:
based on monitoring the user-activity, determining an indication of the at least one user device; and including the indication of the at least one user device in the published response profile.

7. The user-interactive computing device of claim 1, wherein the at least one user device on which the user-activity is monitored is the user-interactive computing device.

8. The user-interactive computing device of claim 1, wherein the first indication of the user command to perform the task is received as a voice command.

9. The user-interactive computing device of claim 1, wherein monitoring the user-activity to determine the first response activity event comprises monitoring a plurality of user devices.

10. The user-interactive computing device of claim 1, wherein determining that the user command is unrecognized comprises:
    determining that the user command does not correspond to a pre-determined response action to be initiated by the user-interactive computing device; and
    in response to determining that the user command does not correspond to a pre-determined response action, causing the user-interactive computing device to enter a failure state, wherein the user-interactive computing device is operable to learn a new response action based on the monitoring of the user-activity occurring subsequent to the received first indication of the user command.

11. The user-interactive computing device of claim 1, wherein the first contextual information, the second contextual information, or both, are determined based on user-specific context features.

12. A computer-implemented method comprising:
    receiving a first indication of a user command to perform a task;
    determining that the user command is unrecognized;
    based on the user command being unrecognized, triggering a monitoring session having a heightened level of monitoring as compared to a level of monitoring when the first indication is received to monitor user-activity associated with at least one user device;
    determining a first response activity event based on the user-activity associated with the at least one user device from the monitoring session and comprising at least one user-activity operation performed by a user on the at least one user device;
    associating the first response activity event, comprising the at least one user-activity operation performed by the user, with the user command, wherein associating the first response activity event with the user command comprises associating first contextual information with the first response activity event, and wherein the first contextual information distinguishes between the first response activity event associated with the user command and a second response activity event associated with the user command;
    subsequent to associating the first response activity event with the user command, receiving a second indication of the user command to perform the task;
    based on the second indication of the user command, the first contextual information, and current contextual information, determining the first response activity event, comprising the at least one user-activity operation performed by the user, associated with the user command; and
    based on the first response activity event, causing the at least one user-activity operation to be performed to facilitate carrying out the task.

13. The computer-implemented method of claim 12, wherein beginning the monitoring session based on the user command comprises:
    comparing the user command against a set of pre-determined commands;
    based on the comparison, determining that the user command is absent from the set of pre-determined commands; and
    initiating the monitoring session.

14. The computer-implemented method of claim 12, further comprising:
    storing a record of the association of the first response activity event and the user command in a data store comprising a plurality of records of associations of the response activity and the user command;
    based on an analysis of the plurality of records of associations of response activity events and the user command, determining a response activity pattern comprising a plurality of associations of the user command and the at least one user-activity operation performed; and
    utilizing the response activity pattern and the second indication of the user command to determine the first response activity event.

15. The computer-implemented method of claim 14, further comprising:
    determining a confidence score for the response activity pattern, the confidence score is determined based on a number of the plurality of records having similar associations of the user command and the at least one user-activity operation performed, wherein the confidence score indicates a probability that the first response activity event is associated with the user command.

16. The computer-implemented method of claim 14, further comprising:
    generating a response profile based on the determined first response activity pattern; and
    associating the response profile with a time or location, wherein the task corresponds with the time or location.

17. A computerized system comprising:
    one or more processors; and
    computer storage memory having computer-executable instructions stored thereon which, when executed by the one or more processors, implement a method comprising:
        receiving a first indication of a user command to perform a task;
        determining that the user command is unrecognized;
        based on the user command being unrecognized, triggering a heightened level of monitoring as compared to a level of monitoring when the first indication is received;
        monitoring user-activity at the heightened level of monitoring to determine a first response activity event comprising at least one user-activity operation performed by a user on at least one user device in a set of user devices associated with the user;
        associating the first response activity event, comprising the at least one user-activity operation performed by the user, with the task, wherein associating the first response activity event with the task comprises associating first contextual information with the first response activity event, and wherein the first contextual information distinguishes between the first response activity event associated with the user command and a second response activity event associated with the user command;

subsequent to associating the first response activity event with the task, receiving a second indication of the user command to perform the task;

based on the second indication of the user command and the first contextual information, determining the first response activity event, comprising the at least one user-activity operation performed by the user, associated with the task; and causing the at least one user-activity operation to be performed to facilitate carrying out the task.

18. The computerized system of claim 17, further comprising:

storing in a data store, a record of the association of the first response activity event and the task;

based on an analysis of a plurality of records of associations of response activity events and the task, determining a response activity pattern comprising a plurality of associations of the task and the at least one user-activity operation performed; and utilizing the response activity pattern to determine the first response activity event.

19. The computerized system of claim 17, wherein causing the at least one user-activity operation to be performed to facilitate carrying out the task comprises:

initiating the at least one user-activity operation on the at least one user device.

20. The computerized system of claim 17, wherein the user command comprises at least one of: a spoken command, a gesture, and a physical interaction.

* * * * *